US010647913B2

(12) United States Patent
Branda et al.

(10) Patent No.: US 10,647,913 B2
(45) Date of Patent: May 12, 2020

(54) PHOTOCHROMIC-ELECTROCHROMIC COMPOSITIONS

(71) Applicant: Switch Materials Inc., Burnaby (CA)

(72) Inventors: Neil Robin Branda, Burnaby (CA); Glen Ramsay Bremner, Burnaby (CA); Jeremy Graham Finden, Burnaby (CA); Matt Andrew Pilapil, Burnaby (CA); Matthew Neal Roberts, Burnaby (CA); Jonathan Ross Sargent, Burnaby (CA); James Daniel Senior, Burnaby (CA); Veronica Elizabeth Patricia Marshman, Burnaby (CA); Natalie E. Campbell, Burnaby (CA)

(73) Assignee: SWITCH MATERIALS INC., Burnaby (CA)

(*) Notice: Subject to any disclaimer, the term of this patent is extended or adjusted under 35 U.S.C. 154(b) by 0 days.

(21) Appl. No.: 15/527,238

(22) PCT Filed: Nov. 17, 2015

(86) PCT No.: PCT/CA2015/051195
§ 371 (c)(1),
(2) Date: May 16, 2017

(87) PCT Pub. No.: WO2016/077918
PCT Pub. Date: May 26, 2016

(65) Prior Publication Data
US 2017/0355901 A1 Dec. 14, 2017

Related U.S. Application Data

(60) Provisional application No. 62/080,859, filed on Nov. 17, 2014, provisional application No. 62/091,369, filed on Dec. 12, 2014.

(51) Int. Cl.
C09K 9/02 (2006.01)
G02B 5/23 (2006.01)
(Continued)

(52) U.S. Cl.
CPC ............... C09K 9/02 (2013.01); G02B 5/23 (2013.01); G02F 1/1503 (2019.01);
(Continued)

(58) Field of Classification Search
CPC .............. C09K 9/02; C09K 2211/1007; C09K 2211/1044; C09K 2211/1088; C09K 2211/1092; G02F 1/1521; G02B 5/23
See application file for complete search history.

(56) References Cited

U.S. PATENT DOCUMENTS 4,902,108 A 2/1990 Byker
5,278,693 A 1/1994 Theiste et al.
(Continued)

FOREIGN PATENT DOCUMENTS

WO 2/18132 A2 3/2002
WO 2004/015024 A1 2/2004
(Continued)

OTHER PUBLICATIONS

Andrea Peters and Neil R. Branda, Electrochromism in Photochromic Dithienylcyclopentenes, J. Am. Chem. Soc. 2003, 125, 3404-3405. (Year: Feb. 28, 2003).*
(Continued)

Primary Examiner — Bijan Ahvazi
(74) Attorney, Agent, or Firm — Cozen O'Connor

(57) ABSTRACT

A composition comprising a diarylethene photochromic anodic species, a cathodic species and an electrolyte that
(Continued)

comprises a supporting electrolyte and a solvent. Electrochromic devices such as optical filters are prepared from such compositions.

18 Claims, 3 Drawing Sheets

(51) Int. Cl.
*G02F 1/15* (2019.01)
*G02F 1/1503* (2019.01)
(52) U.S. Cl.
CPC ............ *C09K 2211/1007* (2013.01); *C09K 2211/1044* (2013.01); *C09K 2211/1088* (2013.01); *C09K 2211/1092* (2013.01); *G02F 2202/14* (2013.01)

(56) References Cited

U.S. PATENT DOCUMENTS

| | | | |
|---|---|---|---|
| 5,336,448 A * | 8/1994 | Byker | C09K 9/02 252/583 |
| 5,457,564 A | 10/1995 | Leventis et al. | |
| 5,998,617 A | 12/1999 | Srinivasa et al. | |
| 6,188,505 B1 | 2/2001 | Lomprey et al. | |
| 6,249,369 B1 | 6/2001 | Theiste et al. | |
| 7,265,888 B2 | 9/2007 | Lomprey et al. | |
| 7,777,055 B2 | 8/2010 | Branda et al. | |
| 2004/0129579 A1 * | 7/2004 | Crooks | C12Q 1/001 205/775 |
| 2004/0257633 A1 * | 12/2004 | Agrawal | B60R 1/088 359/265 |
| 2008/0310007 A1 * | 12/2008 | Agrawal | B82Y 20/00 359/275 |
| 2010/0315693 A1 * | 12/2010 | Lam | G02B 5/23 359/241 |

FOREIGN PATENT DOCUMENTS

| | | | | |
|---|---|---|---|---|
| WO | 2009/087575 A2 | 7/2009 | | |
| WO | 2010/142019 A1 | 12/2010 | | |
| WO | 2011/121078 A1 | 10/2011 | | |
| WO | 2013/044371 A1 | 4/2013 | | |
| WO | 2013/152425 A1 | 10/2013 | | |
| WO | WO 2013152425 | * | 10/2013 | ............ G02F 1/01 |

OTHER PUBLICATIONS

International Search Report and Written Opinion of the International Searching Authority, dated Feb. 3, 2016, for International Application No. PCT/CA2015/051195, 11 pages.
Peters et al., "Electrochromism in Photochromic Dithienylcyclopentenes," *J. Am. Chem. Soc.* 125:3404-3405, 2003.
Zhan, Wei, et al. "Electrochemical Sensing in Microfluidic Systems Using Electrogenerated Chemiluminescence as a Photonic Reporter of Redox Reactions" J. Am. Chem. Soc., 2002, 124, 13265-13270.

* cited by examiner

PHOTOCHROMIC-ELECTROCHROMIC COMPOSITIONS

TECHNICAL FIELD

The present disclosure relates to photochromic-electrochromic compositions.

BACKGROUND

Optical filters are widely used to control visible light and solar energy. Optical filters have found a range of use in vehicle and architectural glazings, as well as opthalmic devices. A number of technologies have been developed to vary the degree of light transmittance using photochromic, thermochromic, electrochromic, liquid crystal and suspended particle display technologies.

Transfer of electrons into or out of electrochromic layers, or oxidation or reduction of chromogenic compounds, enable control of the color or transparency of a switchable material with the application or removal of electricity. U.S. Pat. No. 4,902,108 describes a "self-erasing" electrochromic device where the molar extinction coefficients of the anodic and cathodic compounds in the solution changes with their electrochemical oxidation and reduction. These devices darken with the application of a potential difference, and clear again when the potential is removed. Reversal of polarity is not required to clear the device. U.S. Pat. No. 5,278,693 also describes a self-erasing electrochromic device comprising anodic, electrochromic compounds and cathodic, electrochromic compounds which, upon electrochemical oxidation, increase their molar extinction coefficient in the visible portion of the spectrum. In order to maintain a colored state in such devices (which may be used in some electrochromic mirrors, for example), continuous application of electricity is required. U.S. Pat. No. 5,457,564 suggests that this may be a drawback in large area light modulation applications, and teaches instead a device with surface-confined electrochromic materials. For applications where it is desirable that the inactive (or rest) state is dark or colored (to reduce solar heat gain in a vehicle or building, for example), the power needs can be a substantive drain on a battery over time; any energy savings from reduction of solar heat gain is reduced or negated by the power needed to maintain the dark state.

Some photochromic/electrochromic compounds are dark in their inactive (or rest) state, and oxidation of these compounds electrocatalytically transitions the material to a clear or faded state. The electrochemical oxidation occurring in such a system may be improved by provision of a partner cathodic species that balances the redox chemistry.

SUMMARY

The present invention relates to photochromic-electrochromic compositions.

Photochromic/electrochromic materials that are dark in their inactive, or rest, state nevertheless require an electrochemical process to be faded or cleared, as desired. Initiation of electrochemical oxidation of a species at the anode necessitates a partner electrochemical reduction at the cathode; inclusion of one or more a partner electrochemical species in a composition used for an electrochromic, or photochromic/electrochromic device to minimize, or avoid, degradation of the switchable material, may be desirable.

Color or transparency of a switchable material may be further influenced by the incident light, for chromogenic compounds or switching materials with a photo-responsive aspect. Like any device, improvements are continually sought—longer lifetime, improved cycling time, improved durability, improved UV resistance, cheaper costs, faster manufacturing.

In some aspects, a composition comprising a photochromic-electrochromic compound that is dark, or of a lower light transmittance, in its inactive, or rest, state is provided. Such a composition may comprise a partner cathodic species that balances the redox chemistry and does not interfere with the transition to the dark or faded state with its own coloration.

In some aspects, the relative ratio between charge injection (holes) and moles of photochromic/electrochromic compound that are transitioned to the clear state is less then stoichiometric.

In accordance with an aspect, there is provided a composition comprising: a photochromic, anodic species; a cathodic species; and an electrolyte, the electrolyte comprising a supporting electrolyte; and a solvent portion comprising one or more solvents.

In another aspect, the cathodic species comprises a viologen, a substituted viologen, phenazinium, substituted phenazinium, ferrocenium or substituted ferrocenium salt.

In another aspect, the anodic species and cathodic species are present in a ratio of from about 20:1 to about 2:1.

In another aspect, the anodic species and cathodic species are present in a ratio of from at least about 100:1 to about 5:1.

In another aspect, the anodic species and cathodic species are present in a ratio of from about 100:1 to about 2:1.

In another aspect, the cathodic species has a reduction potential between −1.0 and +0.6 V referenced to Ag/AgCl. Reduction of the cathodic species is reversible.

In another aspect, the composition is transitionable from a light state to a dark state on exposure to light of less than 475 nm, 450 nm, or 400 nm, and from a dark state to a light state with application of a voltage.

In another aspect, the photochromic, anodic species having an oxidation potential of from about 0.6V to about 1.3V.

In another aspect, the composition comprises a second photochromic, anodic species.

In another aspect, the photochromic anodic species are diarylethenes.

In another aspect, a ring-closed oxidation potential of the first photochromic anodic species is less than 200 mV more anodic, or less than 200 mV more cathodic, than a ring-closed oxidation potential of the second photochromic, anodic species.

In another aspect, a ring-closed oxidation potential of the first photochromic anodic species is less than 100 mV more anodic, or less than 100 mV more cathodic, than a ring-closed oxidation potential of the second photochromic, anodic species.

In another aspect, a ring-closed oxidation potential of the first photochromic anodic species is less than 50 mV more anodic, or less than 50 mV more cathodic, than a ring-closed oxidation potential of the second photochromic, anodic species.

In another aspect, a ring-closed oxidation potential of the first photochromic anodic species is less than 25 mV more anodic, or less than 25 mV more cathodic, than a ring-closed oxidation potential of the second photochromic, anodic species.

In another aspect, the composition further comprises a polymer. The polymer may comprise a pendant hydroxyl group, a pendant primary alcohol group, a pendant secondary alcohol group, a pendant epoxide group, or a pendant isocyanate group. The polymer may be crosslinked. Crosslinking may be through the pendant hydroxyl group, or another substituent group. The polymer may be crosslinked via a urethane linkage.

In another aspect, the composition further comprises a polymer comprising one or more monomeric units according to

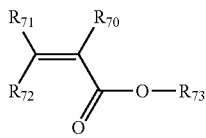

wherein: (i) each of $R_{70}$, $R_{71}$, $R_{72}$ are independently H or a hydrocarbon group $C_n$—$H_{2n+1}$; (ii) $R_{73}$ is H, $C_n$—$H_{2n+1}$, $C_n$—$H_{2n}$—OH, $C_n$—$H_{2n}$—NCO, or

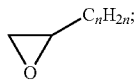

and (iii) n is 1, 2, 3, 4, 5, 6, 7, 8, 9 or 10.

In another aspect, the cathodic species not freely soluble in the electrolyte.

In another aspect, the photochromic, anodic species is soluble in the electrolyte at a concentration of at least about 5 mM, 10 mM, 25 mM, 50 mM, 75 mM, 100 mM or 200 mM.

In another aspect, there is provided an electrochromic device comprising the composition.

In another aspect, there is provided an optical filter, comprising: a first substantially transparent substrate and a second substantially transparent substrate; a first electrode disposed on a surface of the first substantially transparent substrate; a second electrode disposed on a surface of the second substantially transparent substrate; a cathodic material disposed on a surface of the first electrode; a layer of switching material disposed between the first substantially transparent substrate and the second substantially transparent substrate and in contact with the first electrode and the second electrode, the layer of switching material comprising at least one photochromic, anodic species, and an electrolyte comprising a supporting electrolyte and a solvent portion comprising one or more solvents, wherein the cathodic material is insoluble in the layer of switching material.

In another aspect, there is provided an optical filter, comprising: a first substantially transparent substrate and a second substantially transparent substrate; a first electrode and a second electrode disposed on a surface of at least one of said substrates; a layer comprising the photochromic-electrochromic composition disposed between the first substantially transparent substrate and the second substantially transparent substrate, and in contact with the first electrode and the second electrode.

In another aspect, the optical filter comprises a UV light blocker capable of blocking UV light at wavelengths of less than about 365 nm, less than about 375 nm, less than about 385 nm, less than about 400 nm, or less than about 410 nm.

In another aspect, there is provided a method of preparing an optical filter, comprising the steps of: disposing a layer of the composition according to claim 1 between a first substantially transparent substrate and a second substantially transparent substrate wherein a first electrode and a second electrode are disposed on a surface of at least one of the substrates such that the layer is in contact with each electrode; and providing an electrical connector for connecting the first electrode and the second electrode to a source of electric voltage.

This summary does not necessarily describe the entire scope of all aspects. Other aspects, features and advantages will become apparent to those of ordinary skill in the art upon review of the following description of specific embodiments.

BRIEF DESCRIPTION OF THE DRAWINGS

These and other features will become more apparent from the following description in which reference is made to the appended drawings wherein.

DETAILED DESCRIPTION

In the description that follows, a number of terms are used extensively, the following definitions are provided to facilitate understanding of various aspects of the invention. Use of examples in the specification, including examples of terms, is for illustrative purposes only and is not intended to limit the scope and meaning of the embodiments of the invention herein.

This disclosure provides, in part, an improved photochromic-electrochromic switching material. With repeated cycling, protection of components in the switchable material from uncontrolled oxidation or reduction becomes important for continuing function. Irreversibly oxidized or reduced species results in degradation of formulation components, and reduces the performance, and consistency of performance of the switchable material over time. In some embodiments, a switching material may comprise one or more than one cathodic species to improve, in part, the electrical durability, photostability, photostationary state, switching speed or other characteristics of the switching material.

Some photochromic/electrochromic compounds are dark in their inactive, or rest, state, and oxidation of these compounds electrocatalytically transitions the material to a clear or faded state. The electrochemical oxidation occurring in such a system may be improved by provision of a partner cathodic species that balances the redox chemistry and does not interfere with the transition to the dark or faded state with its own coloration. Because of electrocatalytic fading, the relative ratio between charge injection (holes) and moles of photochromic/electrochromic compound that are transitioned to the clear state is less than stoichiometric and therefore colouration due to generation of cathodic materials that are coloured in their reduced state is not detected spectroscopically during the electrochromic transition for darkened to faded state.

Figure 1:
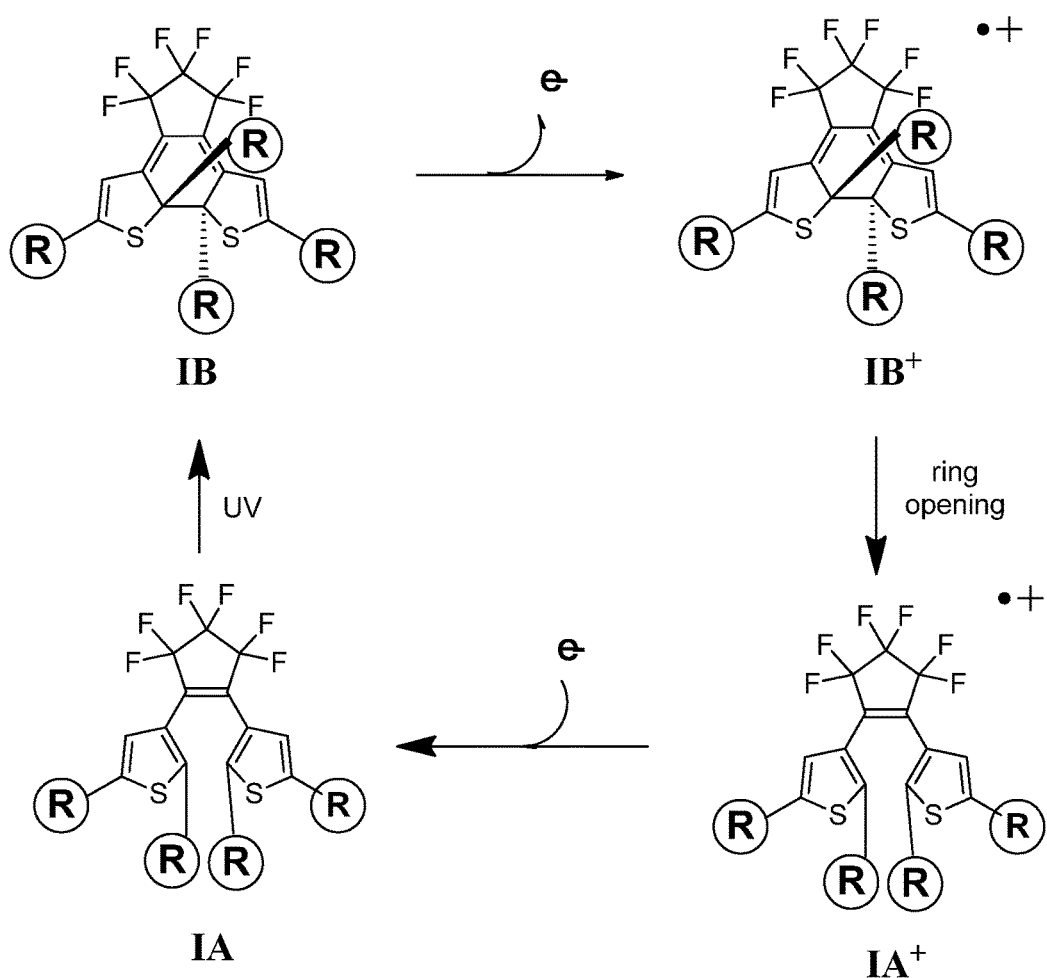
FIG. 1 shows intermediary steps of a general catalytic ring-opening reaction—Formula IB is the ring-closed configuration; Formula IA is the ring-open configuration of a chromophore, according to an embodiment.

The switching material comprises one or more chromophores having both electrochromic and photochromic properties. Chromophores according to some embodiments of the invention include diarylethenes. Examples of such compounds may be found in PCT Publication WO2013/044371, and U.S. Pat. No. 7,777,055, incorporated herein by reference in their entirety. The one or more chromophores are anodic species that may be oxidized with application of a voltage. The catalytic redox cycle of photochromic-electrochromic chromophores is described in U.S. Pat. No. 7,777,055. Referring briefly to FIG. 1, when a potential is applied to a switching material comprising a ring-closed isomer (II) of the chromophore is oxidized to provide radical cation (II+). This radical cation undergoes ring-opening to provide radical cation (I+). As oxidation of the ring open (I) isomer requires a substantially greater potential, the radical cation (I+) oxidizes a neighbouring molecule and is neutralized to provide ring-open isomer (I). The potential required to oxidize the ring-closed and ring-open isomers may vary with chromophore structure. This interconversion between ring-open and ring-closed isomers is repeatable over many cycles. The neighbouring molecule oxidized to provide an electron to neutralize radical cation (I+) may be a chromophore in a ring-closed configuration or may be another neighbouring molecule. Where the oxidized neighbor molecule is a ring-closed chromophore, this contributes to the catalytic ring-opening effect that is advantageous of such systems, allowing transition of the switching material from a dark to a faded state with a less than stoichiometric injection of holes and electrons. The switching material further comprises a cathodic species. The cathodic species may be reduced, accepting electrons as the chromophore is oxidized. Surprisingly, the number of electrons injected into the cathodic species in transitioning the switching material from the dark to faded state is not sufficient to generate a concentration of the reduced state of the cathodic species that can be detected visually or spectroscopically even if the reduced state has high absorption coefficients at some wavelengths in the visible light spectrum because of the less than stoichiometric injection of holes required to ring-open the ring-closed chromophore. Furthermore the required mole ratio of chromophore to cathodic species in the switching material may be less than 1, or less than 0.5, or less than 0.1, or less than 0.05 while still allowing for balanced charge injection into ring-closed chromophores and cathodic species during the electrofading process.

Two or more chromophores with different absorbance peaks in a ring-closed configuration (a dark state) may be combined to provide a range of different colored switching material with a predetermined dark state coloration that can be faded with application of electricity. In some embodiments, it may be desirable to select chromophores with a higher photostationary state (PSS). PSS refers to an equilibrium state of a chromophore where the rate of the ring closing (forward) reaction is equal to the rate of the ring-opening or fading (reverse) reaction, when irradiated with light in a given region of the spectrum; in other words, the ratio of ring-open isomer to ring-closed isomer is at an equilibrium. Some ring-open and ring-closed isomers may undergo isomerization from one to the other in response to different wavelengths of light—if a wavelength of light is used where only one of the isomers absorbs, irradiation results in complete isomerization to the other form. Depending on the use of a compound, one with greater or less sensitivity to light composition may be useful. This equilibrium state may be represented by an absorbance value at a particular wavelength (lambda max), and may include reference to a light source. Where desired, the ratio of ring-open and ring-closed isomers at a PSS may be quantified by $^1$H NMR spectroscopy, such as described in U.S. Pat. No. 7,777,055 (the contents of which are herein incorporated by reference). In some embodiments, compounds with an increased absorbance at a photostationary state (PSS) or a suitable, or increased contrast ratio, or an increased solubility may be an improvement. A compound with a greater absorbance in the visible range may be used in lesser quantities in a formulation or material to achieve a desired contrast ratio, whereas a compound with a lower absorbance at a PSS may need a higher concentration to achieve a desired contrast ratio.

Generally, at PSS, some of the chromophore will be in the ring-closed isomer, with a small, but non-zero portion of ring-open isomer. The oxidation potential of a ring-open isomer may be more anodic than the oxidation potential of a ring-closed isomer. Exposure to a potential that is too far beyond what is necessary to oxidize the ring-closed isomer may result in oxidation of the ring-open isomer, which may be irreversible and result in electrochemically-induced degradation of the chromophore.

In some embodiments, an anodic chromophore may have an oxidation potential of from about 0.4 V to 1.2 V for the ring-closed isomer and about 1.0 V to 2.5 V for the ring-open isomer relative to an Ag/AgCl reference electrode.

In some embodiments comprising two or more chromophores, the chromophores may have different oxidation potentials for the ring-open isomers and/or ring-closed isomers. To allow for oxidation of ring-closed isomers, while avoiding oxidation of a ring-open isomer, combinations of chromophores with closely matched ring-closed oxidation potentials may be selected. In some embodiments, the ring-closed oxidation potential of a first chromophore may be within 0 to 200 mV of the ring-closed oxidation potential of a second chromophore. In some embodiments the ring-closed oxidation potentials of the first and second chromophores may be separated by about 0 to about 200 mV, or any amount or range therebetween, for example 10, 20, 30, 40, 50, 60, 70, 80, 90, 100, 110, 120, 130, 140, 150, 160, 170, 180 or 190 mV.

In some embodiments, it may be desirable for a switching material to provide a uniform transition from a dark state to a faded state. For such embodiments, the first and second chromophores may be selected to have ring-closed oxidation potentials the same, or very close together, so that both ring-closed isomers are oxidized at a substantially equal rate. In other embodiments, it may be desirable for a switching material to transition through one or more intermediate colour states, where the coloration of individual chromophore species is noticeable. By selecting a first chromophore with a ring-closed oxidation potential less than that of the second chromophore, the first chromophore may be fully transitioned to its faded state before the second chromophore, allowing the dark state coloration of the second chromophore to be more pronounced before completing the transition to a fully faded state.

In addition to electrochemical compatibility, chromophores should also have sufficient solubility and compatibility with a selected solvent component, and in a switching material, in both ring-open and ring-closed configurations. A compound with greater solubility allows for a formulation or material with a greater concentration of coloured molecule to be incorporated into a composition. This may allow for increasing the contrast ratio.

Some switching materials are described in PCT Publication WO2013/152425, the contents of which are herein incorporated by reference. In addition to an anodic species and a cathodic species, a switching material may include one or more of a solvent, crosslinkable polymer, polymer, salt, cross-linker, hardener, accelerant (catalyst), co-solvent. A switching material has both electrochromic and photochromic properties. A switching material may darken (e.g. reach a 'dark state') when exposed to ultraviolet (UV) light from a light source, and may lighten ("fade", achieve a 'light state") when exposed to an electric charge. In some embodiments, the switching material may fade upon exposure to selected wavelengths of visible (VIS) light ("photofade", "photobleach"), without sacrifice of the ability to be electrofaded when restored to a darkened state. In some embodiments, the switching material may darken when exposed to light comprising wavelengths from about 350 nm to about 475 nm, or any amount or range therebetween, and may lighten when a voltage is applied, or when exposed to light comprising wavelengths from about 500 to about 700 nm. The switching material may be optically clear. The switching material may be a thermoplastic, thermosetting (uncured) or thermoset (cured) material. The switching material may be a viscoelastic material. The switching material may be cured by heating, exposure to UV light, chemical reaction, irradiation, electron beam processing or a combination thereof.

Cathodic Species

A cathodic species ("cathodic material") may contribute to balancing the redox chemistry of a switching material and may be included in a switching material in a less than stoichiometric amount, relative to the amount of chromophore.

A cathodic species may redox balance an anodic species (e.g. a chromophore), by accepting an electron from a cathode of an electrochromic film during an electrofading process. A cathodic species may demonstrate sufficient stability in both reduced and oxidized forms. A cathodic species may be reversibly reduced and stable through many cycles of reduction and oxidation. A suitably reversible cathodic species may have a peak oxidation current as close to the peak reduction current as possible. This may be expressed as a ratio (equation 1), where the $i_{ox}$ and $i_{red}$ are the oxidation and reduction peak currents in a cyclic voltammogram of a cathodic species in a formulation solvent.

$$\frac{i_{ox}}{i_{red}} = 1 \quad (1)$$

A cathodic species may be coloured or uncoloured in its oxidized, reduced or both oxidized and reduced states. Where a cathodic species is colored in an oxidized state, the color may be complementary to the color of the photochromic, anodic compound in a dark state. In some embodiments, the colored cathodic species may be present in a suitably low concentration so as not to substantially impact the color contribution of the photochromic anodic compound.

A cathodic species may be suitably unreactive with other components of the switchable material in either reduced or oxidized states. A cathodic species is suitably photostable in the switching material.

The reduction potential of a cathodic species should be suitably compatible with the oxidation potential of the anodic chromophore. If a reduction potential of a cathodic species is too close to an oxidation potential of the anodic chromophore, a spontaneous electron transfer may occur, initiating a ring-opening oxidation of the chromophore without the application of electricity. By selecting a cathodic species that are stable in both oxidized and reduced forms, and with a reduction potential more negative than the anodic chromophore, oxidative fading of the switchable material may be prevented in the absence of an applied voltage. In some embodiments the reduction potential of a cathodic species may be about 100, about 200, about 300, about 400 about 500 mV, about 600 mV, about 700 mV, about 800 mV, about 900 mV, about 1000 mV, about 1100 mV, about 1200 mV or more less anodic, than the ring-closed oxidation potentials of the one or more chromophores in the switching material.

In some embodiments, the cathodic limit of the cathodic species is confined by the reduction potential of all other components in the formulation. It is preferable that the cathodic species be the only compound being reduced in the formulation (other than the radical cations of the closed and open chromophores). If the reduction potential of another component of a switching material is less cathodic than the cathodic species, then that compound may be reduced preferentially over the cathodic species, which may result in degradation of that, and/or other components of the switching material, detrimentally affecting performance.

In some embodiments inclusion of a cathodic species may allow for reducing the voltage applied to a device comprising one or more anodic chromophores. Reducing voltage may allow for improved electrical durability, improved weathering durability, improved color stability over time.

In some embodiments, a cathodic species may be deposited on, or bound to, an electrode. The cathodic species may be bound to an electrode by a polymer, or a polymer comprising a cathodic species may be, or be part of, an electrode.

In some embodiments, a cathodic material may include one or more than one 4,4'-bipyridinium cations, accompanied by an anionic components to provide a "bipyridinium salt" or "viologen salt". Some descriptors may refer to these as "dipyridinium salts".

Specific examples of viologen salts are provided for illustrative purposes only, however numerous other viologen salts are contemplated for use in the compositions, devices, methods and uses contemplated herein. Examples of viologen salts are disclosed in U.S. Pat. No. 4,902,108, U.S. Pat. No. 5,998,617, U.S. Pat. No. 6,188,505, U.S. Pat. No. 5,336,448. A viologen salt includes an anionic and a cationic component. Examples of some viologen salt cationic components include, but are not limited to:

1-(3,5-dimethoxyphenyl)-1'-methyl 4,4'-bipyridinium
1-(4-cyanophenyl)-1'-methyl-4,4'-bipyridinium
1-(4-methoxyphenyl)-1'-methyl-4,4'-bipyridinium
1,1',2,2',6-pentamethyl-6'-(3-phenyl(n-propyl))-bipyridinium
1,1',2,2',6-pentamethyl-6'-n-hexyl-4,4'-bipyridinium
1,1',2,2'-tetramethyl-6,6'-bis-n-hexyl-4,4'-bipyridinium
1,1',2-trimethyl-2',6,6'-tris(2-phenylethyl)-4,4'-bipyridinium
1,1'-bis(3-phenyl(n-propyl))-4,4'-bipyridinium
1,1'-bis(2,4,6-trimethylphenyl)-4,4'-bipyridinium
1,1'-bis(2,6-dimethylphenyl)-4,4'-bipyridinium
1,1'-bis(3,5-dimethylphenyl)-4,4'-bipyridinium 1,1'-bis(3-phenyl(n-propyl))-4,4'-bipyridinium (phenylpropyl viologen)
1,1'-dibenzyl-2,2',6,6'-tetraalkyl-4,4'-bipyridinium
1,1'-dibenzyl-2,2',6,6'-tetramethyl-4,4'-bipyridinium
1,1'-dibenzyl-2,2'-dimethyl-4,4'-bipyridinium
1,1'-diethyl-2,2',6,6'-tetramethyl-4,4'-bipyridinium
1,1'-dimethyl-2,6-diphenyl-4,4'-bipyridinium
1,1'-dimethyl-2-(3-phenyl(n-propyl))-4,4'-bipyridinium
1,1'-dimethyl-2,2'-bis(3-phenyl(n-propyl))-4,4'-bipyridinium
1,1'-dimethyl-4,4'-(1,3,5-triazine-2,4-diyl) bipyridinium
1,1'-dimethyl-4,4'-bipyridinium (methyl viologen)
1,1'-di-n-butyl-2,2',6,6'-tetramethyl-4,4'-bipyridinium
1,1'-diphenyl-4,4'-bipyridinium (benzyl viologen)
1,1'-ethylene-4,4'-dimethyl-2,2'-bipyridinium
1,2,6-trimethyl-1'-phenyl-4,4'-bipyridinium b
1-methyl-1'-(2,4,6-trimethylphenyl)-4,4'-bipyridinium
1-methyl-1'-(2-methylphenyl)-4,4'-bipyridinium
1-methyl-1'-phenyl-4,4'-bipyridinium
1-methyl-4-(1,3,5-triazine-2-yl)-pyridinium
1-phenyl-1'-(4-dodecylphenyl)-4,4'-bipyridinium
2,2',6,6'-Tetramethyl-4,4'-Bipyridinium
1,1'-dioctyl-4,4'-bipyridinium (octyl viologen)
1,1'-dioctadecyl-4,4'-bipyridinium (dioctadecyl viologen)
1,1'-diheptyl-4,4'-bipyridinium (heptyl viologen)
1,1'-diethyl-4,4'-bipyridinium (ethyl viologen)

In some embodiments, the anionic component may be selected from the group comprising F$^-$, Cl$^-$, Br$^-$, I$^-$, perchlorate (ClO$_4^-$), nitrate (NO$_3^-$), sulfate (SO$_4^-$), tetrafluoroborate (BF$_4^-$), hexafluorophosphate (PF$_6^-$), trifluoromethanesulfonate (TFMS$^-$), tetraphenylborate ((C$_6$H$_5$)$_4$B$^-$; or "BPh$_4^-$"), bis(trifluoromethanesulfonyl)imide (-TFSI$^-$), bis(oxalato)borate (BOB$^-$) ions, organosulfate ($^-$SO$_4$R$_{11}$), tris(pentafluoroethyl)trifluorophophate (FAP) or the like.

In some embodiments, a cathodic material may include one or more than one ferrocenium salts. Chemical oxidation of a ferrocene, or ring-substituted derivative thereof yields a 1+ charged species, which may be provided as a salt (a "ferrocenium salt").

Formula II illustrates an exemplary ferrocenium salt of decamethylferrocene, where Z is an anionic component, and all of R$_{21}$ to R$_{30}$ are methyl. As indicated herein, other ferrocenium cations are possible, in combination with various anionic components.

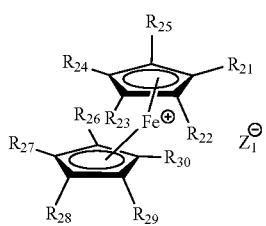

Specific examples of ferrocenium salts are provided for illustrative purposes only. However numerous other ferrocenium salts are contemplated for use in the compositions, devices, methods and uses contemplated herein. Examples of ferrocenium salts are disclosed in U.S. Pat. No. 4,902,108, U.S. Pat. No. 6,188,505, U.S. Pat. No. 7,265,888. A ferrocenium salt includes an anionic and cationic component. Examples of ferrocenium salt cationic components include, but are not limited to:

(3-(tetra-tert-butylferrocenium)propyl)triethylammonium
(6-(tetra-tert-butylferrocenium)hexyl)triethylammonium
Decamethylferrocenium
Dimethylferrocenium
di-tert-butyl-diethylferrocenium
Ferrocenium
Octamethyldimethoxyethylcarbonate ferrocenium
Octamethylferrocenium In some embodiments, the anionic component may be selected from the group comprising F$^-$, Cl$^-$, Br$^-$, I$^-$, perchlorate (ClO$_4^-$), nitrate (NO$_3^-$), sulfate (SO$_4^-$), tetrafluoroborate (BF$_4^-$), hexafluorophosphate (PF$_6^-$), trifluoromethanesulfonate (TFMS$^-$), tetraphenylborate ((C$_6$H$_5$)$_4$B$^-$; or "BPh$_4^-$"), bis(trifluoromethanesulfonyl)imide (-TFSI$^-$), bis(oxalato)borate (BOB$^-$) ions, organosulfate ($^-$SO$_4$R$_{11}$), tris(pentafluoroethyl)trifluorophophate (FAP) or the like.

In some embodiments, a cathodic material may include one or more than one phenazine cations, accompanied by an anionic component (Z-) to provide a "phenazinium salt". Some descriptors may refer to these as "dihydrophenazine" or "dihydrophenazine salt. Chemical oxidation of a 5,10-dihydrophenazine, or ring substituted or heteroatom-substituted derivative thereof yields a 1+ charged species, which may be provided as a salt (a "phenazinium salt").

Formula III illustrates an exemplary phenazinium salt of 5,10-dimethylphenazine, with a BF$_4^-$ anionic component. As indicated herein, other phenazinium cations are possible, in combination with other anionic components

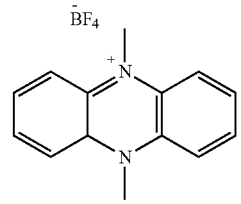

Specific examples of phenazinium salts are provided for illustrative purposes only; however numerous other phenazinium salts are contemplated for use in the compositions, devices, methods and uses contemplated herein. Examples of phenazinium salts are disclosed in U.S. Pat. No. 4,902,108, U.S. Pat. No. 5,998,617, U.S. Pat. No. 6,188,505, U.S. Pat. No. 6,249,369, a phenazinium salt includes an anionic and cationic component. Examples of some "phenazines" that may be oxidized to the corresponding cation ("phenazinium") include, but are not limited to:

5,10-dimethylphenazine
3,7,10-trimethylphenothiazine
1,4-bis(5,10-dihydro-5-butyl-10-phenazine)benzene
5,5',10,10'-tetrahydro-bis(5,5'-dibutylphenazine)-1,4-benzene
5,5',10,10'-tetrahydro-5,5',10,10'-tetrabutyl 2,2'bis(7,7'-trifluoromethylphenazine)
5,5',10,10'-tetrahydro-bis(5,5'-diphenylphenazine)-1,4-buta-(1,3)-diyne
bis 1,2-(5,10-tetrahydro-5,10-dimethylphenazine)ethene
5,5',7(8),7'(8'),10,10'-hexamethyl-2,2'-bisphenazine
5,10-dihydro-5,10-dimethylphenazine
5,10-dimethyl-5,10-dihydrophenazine
2,5,10-trimethyl-3-phenyl-5,10-dihydrophenazine
5-ethyl-10-methyl-5,10-dihydrophenazine
5,10-dimethyl-5,10-dihydrobenzo(A)phenazine
2,7-diphenoxy-5,10-dimethyl-5,10-dihydrophenazine 2-phenoxy-5,10-dimethyl-5,10-dihydrophenazine
2,7-bis(o-tolyl)-5,10-dimethyl-5,10-dihydrophenazine
2,3-dimethyl-7-trifluoromethyl-5,10-diethyl-5,10-dihydrophenazine
5,10-dimethyl-5,10-dihydrophenazine
2,3-diphenyl-5,10-dimethyl-5,10-dihydrophenazine
2,7-diphenyl-5,10-dimethyl-5,10-dihydrophenazine
2-vinyl-5,10-dimethyl-5,10-dihydrophenazine
2-phenyl-5,10-dimethyl-5,10-dihydrophenazine
5,10-diisopropyl-5,10-dihydrophenazine
5,10-dimethyl-5,10-dihydrodibenzo(A,C)phenazine
1,5,10-trimethyl-2-phenyl-5,10-dihydrophenazine
2,3,5,10-tetramethyl-7-trifluoromethyl-5,10-dihydrophenazine
2,3,5,10-tetramethyl-5,10-dihydrobenzo(B)phenazine
2,7-diphenoxy-5,10-dimethyl-5,10-dihydrophenazine
10,10'-dimethyl-3,3'-bisphenothiazine
5,5',10,10'-tetramethyl-2,2'-bisphenazine
5,5',10,10'-tetramethyl-2,2'-bis[a]benzophenazine
5,5',10,10'-tetramethyl-2,2'-bis[a,c]benzophenazine
5,5',10,10'-tetrahydro-5,5',6,6',10,10'-hexamethyl-2,2'-bisphenazine
5-methylphenazine
10-methyl-4H-phenothiazine
5,10-dimethyl-9,10-dihydrophenazine
5,10-diisopropyl-9,10,dihydrophenazine
Phenazine ethosulfate In some embodiments, the anionic component may be selected from the group comprising F$^-$, Cl$^-$, Br$^-$, I$^-$, perchlorate (ClO$_4^-$), nitrate (NO$_3^-$), sulfate (SO$_4^-$), tetrafluoroborate (BF$_4^-$), hexafluorophosphate (PF$_6^-$), trifluoromethanesulfonate (TFMS$^-$), tetraphenylborate ((C$_6$H$_5$)$_4$B$^-$; or "BPh$_4^-$"), bis(trifluoromethanesulfonyl)imide (-TFSI$^-$), bis(oxalato)borate (BOB$^-$) ions, organosulfate ($^-$SO$_4$R$_{11}$), tris(pentafluoroethyl)trifluorophophate (FAP) or the like.

Solvent Portion

The solvent portion ("solvent") of a switching material (one or more solvents combined to provide a solvent portion) dissolves the formulation components and facilitates diffusion of the chromophore and cathodic species through the formulation and to and from the electrodes. The chromophore and cathodic species in all redox states may be soluble in the solvent, to avoid precipitation, crystallization or passivation of the electrode by insoluble material. In some embodiments, the chromophore is soluble in all redox states and the cathodic species is deposited on one electrode to provide a modified electrode. The cathodic so deposited may not subsequently dissolve, or re-dissolve into the solvent in a reduced or an oxidized state. The solvent may be inert, and does not participate in any side reactions, or undergo degradation with weathering.

In some embodiments, the solvent portion may comprise a single solvent, or a blend of two or more solvents in any suitable ratio. In some embodiments, the one or more solvents may include:

A) a cyclic carbonate:

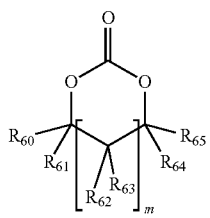

wherein each of $R_{60}$, $R_{61}$, $R_{62}$, $R_{63}$, $R_{64}$ and $R_{65}$ are the same or different, and are independently H, or $C_p$—H$_{2p+1}$;
p is 1, 2, 3, 4, or 5, 6, 7, 8, 9 or 10;
m is 0, 1, 2, 3, 4 or 5;

B) a carbonate:

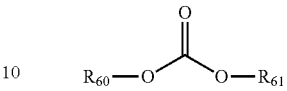

wherein each of $R_{60}$ and $R_{61}$ are the same or different, and are independently $C_p$—H$_{2p+1}$, and p is as defined herein;

C) an alkyl ether:

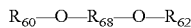

wherein $R_{68}$ is —(CH$_2$)$_p$—; each of $R_{60}$ and $R_{62}$ are the same or different, and are independently $C_p$—H$_{2p+1}$, and p is as defined herein;

D) An ester:

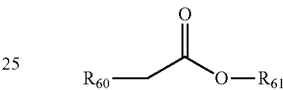

Wherein each of $R_{60}$ and $R_{61}$ are the same or different, and are independently $C_p$—H$_{2p+1}$, and p is as defined herein;

E) a diester:

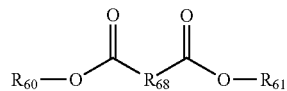

wherein $R_{68}$ is —(C$_p$H$_{2p}$)— and p is as defined herein; each of $R_{60}$ and $R_{62}$ are the same or different, and are independently $C_p$—H$_{2p+1}$;

F) a lactone:

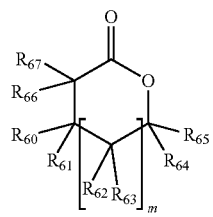

wherein each of $R_{60}$, $R_{61}$, $R_{62}$, $R_{63}$, $R_{64}$, $R_{65}$, $R_{66}$ and $R_{67}$ are the same or different, and are independently H, or $C_p$—H$_{2p+1}$, and p is as defined herein.

In other embodiments, some examples of solvents that may be used in a switching material may include one or more of: triglyme, tetraglyme, 1,2-propylene carbonate, ethylene carbonate, 1,2-butylene carbonate, 2,3-butylene carbonate, delta-valerolactone, 3-methyl-2-oxazolidone, tetramethylurea, butyrolactone, cyclopentanone, ethylene glycol phenyl ether; diethylene glycol monobutyl ether; diethyl succinate; dimethyl glutarate; diethylene glycol n-butyl ether acetate; diisobutyl adipate; dihexyl azelate; diethyl maleate; diisooctyl azelate; triethylene glycol monobutyl ether (butoxytriglycol); diisooctyl dodecanedioate; 2-(2-ethylhexyloxy)ethanol; glyceryl triacetate; tetramethylene sulfoxide; dibutyl adipate; 3-dodecylheptamethyltrisiloxane; diethyl sebacate; dibutyl itaconate; 1,4-butanediol; butyl sulfoxide; diethylene glycol; octyl octanoate; hexyl octanoate; diisodecyl adipate; diethylene glycol monoethyl ether acetate; 1,3/1,4-cyclohexanedimethanol; 1-decanol; 2-methylglutaronitrile; methyl palmitate; tri(propylene glycol) butyl ether; 1-dodecanol; tetradecane; diethylene glycol hexyl ether; dioctyl ether; methyl stearate; hexyl hexanoate; butyl diglyme; triisopentylamine; Bis(2-ethylhexyl) sebacate; 1,5-dicyanopentane; diisobutyl fumarate; 2,2,4-trimethyl-1.3-pentanediol dibenzoate; poly(ethylene glycol) monolaurate; poly(ethylene glycol) monooleate; hexaethyldisiloxane; poly(ethylene glycol) dioleate; triethylene glycol di-2-ethyl butyrate; tributyrin, 1,2,3-propanetriyl ester; tetramethylene sulfone (sulfolane); polyethylene glycol dimethyl ether; bis(2-ethylhexyl) adipate; tetraethylene glycol; hexa-decamethylheptasiloxane; dioctyl terephthalate; Bis[2-(2-butoxyethoxy)ethyl] adipate; triethylene glycol bis(2-ethylhexanoate); propylene carbonate; triethylene glycol monomethyl ether (methoxytriglycol); triethylene glycol monoethyl ether (ethoxytriglycol); 18-crown-ether; 1,3-dimethylimidazolidinone; poly(ethylene glycol) bis(2-ethylhexanoate); 1,5-pentanediol; di(ethylene glycol) dibenzoate; 2-ethylhexyl-(s)-lactate; tripropylene glycol; dipropylene glycol; 2,2,4-trimethyl-1,3-pentanediol monoisobutyrate ("Texanol"); tri(propylene glycol) methyl ether; di(propylene glycol) dibenzoate; dipropylene glycol n-butyl ether; diethyl azelate; dimethyl adipate, diethyl adipate, poly(propylene glycol) dibenzoate; propylene glycol phenyl ether; poly(ethylene glycol) dibenzoate; 2-ethyl-1,3-hexanediol; propylene glycol diacetate, dibutyl itaconate, dimethylglutarate, diethyl-2-dimethyl glutarate, dimethyl-2-methyl glutarate ("Rhodiasolv IRIS"); or the like.

A solvent portion of a switching material or composition may comprise one or more solvents in an amount from about 30% to about 95% (by weight), for example 30, 40, 50, 60, 70, 80 or 90%, or any amount or range therebetween. Second, third, fourth or more solvents may each comprise from about 1% to about 50% of the solvent portion, for example 1, 2, 3, 4, 5, 10, 15, 20, 25, 30, 35, 40, 45 or 50% of the solvent portion, or any amount or range therebetween.

Supporting electrolyte: A switching material may further comprise a supporting electrolyte. A supporting electrolyte provides ionic conductivity to the switching material, and may 'screen' the redox active species (in their charged state) from the charge at the electrode. Screening of the redox active species becomes important if the electric field lines in the formulation are not uniform. In this scenario, the redox active species will preferentially migrate to areas of the electrode with stronger electric fields. This can lead to a non-homogenous concentration distribution of chromophore/cathodic species across the device. A supporting electrolyte may be generally inert, have a high ionic strength in solution, and generally comprises a cation and an anion pair. A supporting electrolyte should not undergo electrochemical oxidation/reduction within the voltage range where the switching material will be used. In some embodiments, the electrochemical reactivity may be influenced by the electrode and solvent.

In a solution, a supporting electrolyte may separate into cation and anion components, forming a solution in the solvent portion, which may migrate to negative and positive electrodes in a system where electricity is applied, such as a switchable film comprising a switching material and first and second electrodes. The supporting electrolyte may have a high dissociation constant in the solvent system. In some embodiments, a supporting electrolyte with a high dissociation constant, such as an ionic liquid may exist as free ions even in a solvent with a lower dielectric constant.

In some embodiments, the cation of a supporting electrolyte may be organic or inorganic. A cationic component of a supporting electrolyte may include an alkali metal ion (e.g. $Li^+$, $Na^+$, $K^+$, $Cs^+$), ammonium ion, alkyl ammonium ion, phosphonium ion, alkyl phosphonium ion, imidazolium ion, alkyl imidazolium ion, pyrridolinium ion, alkyl pyrridolinium ion, piperidinium ion, alkyl piperidinium ion or the like. In some embodiments the anion of a supporting electrolyte may be organic or inorganic.

An anionic component of a supporting electrolyte may include a halide ion (e.g. $Cl^-$, $Br^-$, $I^-$), perchlorate ($ClO_4^-$), nitrate ($NO_3^-$), sulfate ($SO_4^{2-}$), tetrafluoroborate ($BF_4^-$), hexafluorophosphate ($PF_6^-$), trifluoromethanesulfonate (TFMS), tetraphenylborate (($C_6H_5)_4B^-$; or "$BPh_4^-$"), bis(trifluoromethanesulfonyl)imide (-TFSI), bis(oxalato)borate (BOB) ions, tris(pentafluoroethyl)trifluorophosphate (FAP) or the like.

"Alkyl" may be from 1 to 10 carbons (e.g. methyl, ethyl, propyl, butyl, pentyl, hexyl, phenyl, or the like).

In some embodiments, a supporting electrolyte may be selected from a group comprising:
Trihexyl(tetradecyl)phosphonium tetrafluoroborate
1,3-Diisopropylimidazolium Tetrafluoroborate
1,3-ditertbutylimidazolinium tetrafluoroborate
1-Hexyl-3-Methylimidazolium Tetrafluoroborate
cesium tetraphenylborate
hexadecyltrimethylammonium tetrafluoroborate
Lithium bis(oxalato)borate
Lithium tetrafluoroborate
potassium tetrafluoroborate
potassium tetraphenylborate
sodium tetrafluoroborate
sodium tetraphenylborate
tetrabutylammonium bis(oxalato)borate
tetrabutylammonium tetrafluoroborate
tetrabutylammonium tetraphenylborate
tetrabutylphosphonium tetrafluoroborate
Tetraethylammonium tetrafluoroborate
tetrahexylammonium tetrafluoroborate
tetramethylammonium tetrafluoroborate
Tetraphenylphosphonium Tetrafluoroborate
Tetraphenylphosphonium Tetraphenylborate
1-Butyl-1-Methylpyrrolidinium Tris(Pentafluoroethyl) Trifluorophosphate
1-ethyl-3-methylimidazolium tris(pentafluoroethyl)trifluorophosphate
Ethyldimethyl-(2-methoxyethyl)ammonium tris(pentafluoroethyl)trifluorophosphate
Tetramethylammonium Tris(Pentafluoroethyl)Trifluorophosphate
Trihexyl(tetradecyl)phosphonium chloride
1,2-Dimethyl-3-Propylimidazolium Iodide
Benzyltriphenylphosphonium Bromide
cesium chloride
Cinnamyltriphenylphosphonium Bromide
Methyltriphenylphosphonium Bromide
tetrabutylammonium bromide
tetrabutylammonium chloride
tetrabutylammonium iodide
tetrabutylammonium tribromide
Tetraethylammonium iodide
Tetrahexylammonium bromide
tetrahexylammonium chloride
tetrahexylammonium iodide tetramethylammonium bromide
tetramethylammonium chloride
tetraoctylammonium bromide
Cesium nitrate
potassium nitrate
Sodium nitrate
tetrabutylammonium nitrate
1-Butyl-1-methylpyrrolidinium triflate
Lithium trifluoromethanesulfonate
potassium trifluoromethanesulfonate
sodium trifluoromethanesulfonate
tetrabutylammonium triflate
Tetrabutylammonium trifluoromethanesulfonate
cesium perchlorate
sodium perchlorate
tetrabutylammonium perchlorate
tetraethylammonium perchlorate
tetrahexylammonium perchlorate
1-Butyl-3-Methylimidazolium Hexafluorophosphate
1-Ethyl-3-Methylimidazolium Dimethylphosphate
potassium hexafluorophosphate
sodium hexafluorophosphate
tetrabutylammonium hexafluorophosphate
tetrabutylphosphonium hexafluorophosphate
Tetraphenylphosphonium hexafluorophosphate
Trihexyl(tetradecyl)phosphonium hexafluorophosphate
1-Ethyl-3-Methyl-Imidazolium Methyl Sulfate
cesium sulfate
Potassium sulfate
sodium sulfate
tetramethylammonium sulfate
Tributyl(methyl)phosphonium methylsulfate
1,2-Dimethyl-3-propylimidazolium bis(trifluoromethylsulfonyl)imide
1-Butyl-1-methylpiperidinium bis(trifluoromethylsulfonyl)imide
1-Butyl-1-methylpyrrolidinium bis(trifluoromethylsulfonyl)imide
1-ethyl-1-methylpyrroldinium bis(trifluoromethylsulfonyl)imide
1-Methyl-1-Propylpiperidinium Bis(Trifluoromethylsulfonyl)Imide
Acetylcholine bis(trifluoromethylsulfonyl)imide
Butyltrimethylammonium bis(trifluoromethylsulfonyl)imide
lithium bis(trifluoromethylsulfonyl)imide
N,N-Diethyl-N-methyl-N-(2-methoxyethyl)ammonium bis(trifluoromethylsulfonyl)imide
N,N-Diethyl-N-methyl-N-(2-methoxyethyl)ammonium tetrafluoroborate
potassium bis(trifluoromethylsulfonyl)imide
tetrabutylammonium bis(trifluoromethylsulfonyl)imide
Tributylmethylammonium bis(trifluoromethylsulfonyl)imide
Tributylmethylphosphonium bis(trifluoromethylsulfonyl)imide
Triethyl(2-Methoxyethyl)Phosphonium Bis(Trifluoromethylsulfonyl) Imide
Trihexyl(tetradecyl)phosphonium bis(trifluoromethylsulfonyl)imide
Tri-n-butyloctylphosphonium bis(trifluoromethylsulfonyl)imide
Trihexyl(tetradecyl)phosphonium decanoate
Trihexyl(tetradecyl)phosphonium dicyanamide.

The one or more supporting electrolytes may be present in an amount from about 0.05% to about 10% (by weight) or any amount or range therebetween, for example 0.05, 0.1, 0.2, 0.4, 0.6, 0.8, 1, 2, 3, 4, 5, 6, 7, 8, or 9%, or any amount or range therebetween.

A solvent portion comprising one or more solvents, together with one or more supporting electrolyte, and optionally other components, may be referred to as an electrolyte, or an electrolyte portion of the switching material. The electrolyte may comprise a mobile phase of the switching material and allow sufficient mobility of the chromophore(s) to facilitate the oxidative ring opening of chromophores.

Polymer component: A switching material may further comprise one or more polymers. Inclusion of one or more polymers may be used to adjust viscosity, adjust adhesion of the switching material to a substrate, provide sufficient rigidity to maintain separation of the substrates when a switching film is processed by a film coating method, such as roll to roll, or if a film is laminated with heat and pressure. The one or more polymers may include reactive groups that may crosslink intramolecularly or intermolecularly. A switching material may comprise one, or more than one polymers; the switching material may be thermoplastic, or thermoset, or a combination of the two (e.g. partially cured). A polymer may comprise a homopolymer or a copolymer; the copolymer may be a random, block, alternating, or periodic copolymer, or the like. A polymer may comprise a linear, branched, or dendrimeric polymer. A polymer may have any pendant group suitable for crosslinking; in some embodiments, the polymer is a polyol. A polyol may have a hydroxyl functionality of at least 2. The polyol may be available commercially, or may be prepared (monomers pre-polymerized in advance of combining with other components of a formulation). The hydroxyl groups may interact with other functional groups on a crosslinking agent, or on other polymers. Examples of such other functional groups may include isocyanate, metal alkoxide, ketene, thiol.

In other embodiments where the switching material is to be cast in a mold or coated in a manner that is less dependent on viscosity and surface tension to maintain an even and sufficiently thin layer on a moving web, the polymerization may occur in situ—the switching material may comprise monomers that are polymerized in situ, followed by crosslinking in situ.

Examples of polymers comprising pendant —OH groups (polyols) include, but are not limited to, ethylene vinyl alcohol copolymer, polyvinyl alcohol (PVOH, PVAl), polyvinyl acetals, glycerol propoxylate-block-ethoxylate, poly(ethylene oxide) (PEO), partially hydrolyzed ethylene vinyl acetate (EVA), some fluoropolymers (e.g. those described in WO2011/121078), cellulose acetate butyrate, or the like. A cellulose acetate butyrate may be of any suitable molecular weight range including for example from about 10,000 up to about 150,000 or any range in between, and may contain an acetyl content of from about 10 to about 35 weight percent or any range in between, a butyryl content of from about 20 to about 60 weight percent or any range in between and an hydroxyl content of from about 0.5 to about 5 weight percent or range in between. A polyvinyl alcohol may be of any suitable molecular weight range to provide the desired molecular weight range of the polyvinyl acetal polymer. The aldehyde used for the production of the polyvinyl acetal is not particularly limited, and may include, for example, formaldehyde (including paraformaldehyde), acetaldehyde (including paraacetaldehyde), propanal, propionaldehyde, butyraldehyde, n-octyl aldehyde, amyl aldehyde, hexyl aldehyde, heptyl aldehyde, 2-ethylhexyl aldehyde, cyclohexyl aldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, beta-phenylpropionaldehyde or the like. The aldehyde may be used singly, or two or more may be used in combination. In some embodiments, the aldehyde is butyraldehyde, and the polymer is PVB. Some PVB resins may have an —OH group content of from about 18 to about 21%.

In some embodiments the polymer may comprise recurring units of one or more than one monomers according to Formula VI:

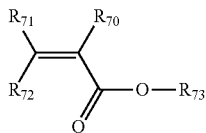

wherein:
each of $R_{70}$, $R_{71}$, $R_{72}$ are the same or different, are independently H, or a hydrocarbon group $C_nH_{2n+1}$;
$R_{73}$ is H, or $C_nH_{2n+1}$, $C_nH_{2n}OH$, $C_nH_{2n}NCO$, or

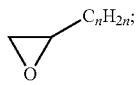

and
n is 1, 2, 3, 4, 5, 6, 7, 8, 9 or 10;

In some embodiments, monomers may include one or more of methyl methacrylate; methyl acrylate; isocyanatoethyl methacrylate; 2-isocyanatoethyl acrylate; 2-hydroxyethyl methacrylate; 2-hydroxyethyl acrylate; 3-hydroxypropyl methacrylate; glycidyl methacrylate.

One or more than one monomer may be pre-polymerized together to provide a polymer, copolymer, terpolymer or the like. In some embodiments, one monomer may be polymerized to provide a homogeneous polymer (e.g. poly(2-hydroxyethyl methacrylate). In other embodiments, a first monomer unit with a pendant group that participates in a crosslinking reaction may be combined with a second monomer unit that may have the same or different pendant group (or no pendant group) to provide a copolymer. A copolymer may have a ratio of first and second monomer units in the range of from about 200:1 to about 1:200. Terpolymers may be provided in a similar manner, combining a first, a second and a third monomer in a suitable ratio.

In some embodiments, the polymer may be a copolymer with hydroxyethyl methacrylate and methyl methacrylate monomers in a ratio of from about 1:1 to about 1:50, or any amount or range therebetween, for example about 1:5, 1:10 or 1:20.

One or more polymers may be present in a composition, each in an amount of about 0.5 wt % to about 25 wt %, or any amount or range therebetween, for example 1, 2, 3, 4, 5, 6, 7, 8, 9, 10, 11, 12, 13, 14, 15, 16, 17, 18, 19, 20, 21, 22, 23 or 24 wt %.

Crosslinking/curing package: In some embodiments, the one or more polymers may be crosslinked. A cross-linker (cross-linking agent) may comprise two or more reactive groups. Reactive groups may independently be, for example, aldehyde, epoxide, isocyanate, silanes, melamines, phenolic resins or the like. A crosslinking agent may be soluble in a solvent portion of a switching material. Examples of aldehyde crosslinkers include, but are not limited to, terephthalaldehyde and the like. Examples of epoxides include, but are not limited to, diglycidyl ethers of polypropylene glycol (e.g. DER736, DER732, both from Dow Chemical), bisphenol A diglycidyl ether (BADGE), 1,4-butanediol diglycidyl ether, 1,4-cyclohexanedimethanol diglycidyl ether, 1,2,5,6-diepoxycyclooctane, resorcinol diglycidyl ether, tris(4-hydroxyphenyl)methane triglycidyl ether or diglycidyl 1,2-cyclohexanedicarboxylate and the like. Examples of isocyanate crosslinking agents include, but are not limited to, aromatic and aliphatic isocyanates; examples of aliphatic isocyanates include, but are not limited to, hexamethylene diisocyanate (HMDI), dimers, trimers, or multimers of HMDI (e.g. DESMODUR™ N100, N3300A, N3600 from Bayer), isophorone diisocyanate, methylene dicyclohexyl diisocyanate, xylylene diisocyanate, cyclohexane diisocyanate, tetramethyl xylylene diisocyanate, isopropenyl dimethylbenzyl isocyanate, trimethylhexamethylene diisocyanate, norbornane diisocyanate or the like. Examples of aromatic diisocyanates include, but are not limited to, diphenylmethane diisocyante, toluene diisocyanate, p-phenylene diisocyanate, naphthalene diisocyanate or the like. The isocyanate crosslinking agent may be a blocked isocyanate, e.g. a malonate, triazole, caprolactam, sulfite, phenol, keotoxime, pyrazole or alcohol blocked isocyanate. A blocked isocyanate may be advantageous in some embodiments, as it may remain unreactive with other components of the formulation until 'unblocking'—unblocking of the blocked isocyanate may be performed, for example, by heating the formulation. The cross linker may be present in a composition or formulation in an amount of about 0.01% to about 10%, or any amount or range therebetween, for example 0.02, 0.04, 0.06, 0.08, 0.1, 0.2, 0.3, 0.4, 0.5, 1, 2, 3, 4, 5, 6, 7, 8, or 9 wt %.

Hardeners: An epoxide crosslinking agent may be used in combination with a hardener. A hardener ("curing agent") may be an anhydride, for example MHHPA (methylhexahydrophthalic anhydride) THPA (tetrahydrophthalic anhydride), MTHPA (methyltetrahydrophthalic anhydride), HHPA (hexahydrophthalic anhydride), 4-MHHPA or the like. A hardener may be soluble in a solvent portion of the switching material. A hardener may be present in a composition or formulation in an amount of about 0.5% to about 10%, or any amount or range therebetween, for example 1, 2, 3, 4, 5, 6, 7, 8, or 9 wt %.

Accelerant: An accelerant may alternately be referred to as a 'catalyst'. Examples of accelerants that may be used with materials comprising an epoxide reactive group may include AMC-2 (chromium 2-ethylhexanoate in Palatinol 711P), ATC-3 (AMPAC Fine Chemicals), zinc 2-ethyl hexanoate (99%, or 80% in mineral spirits), AC8 (Available from Broadview), CXC1612 or CXC1613 (King Industries), 1,4-diazabicyclo[2.2.2]octane (DABCO), HCl, p-toluenesulfonic acid, potassium t-butoxide, Tyzor ZEC (Dorf-Ketal), Tyzor AA75 (Dorf-Ketal), titanium tetraisopropoxide, copper (II) chloride. Examples of accelerants that may be used with materials comprising an isocyanate reactive group may include dibutyltin dilaurate, dibutyltin diacetate, dibutyltin oxide, transition metal complexes of acetylacetonates, octanoates, metal chelates (e.g. zirconium or aluminum chelates), carboxylates (e.g. bismuth or mixed carboxylates), KKAT6212 (King Industries) or the like. A pot life extender may be included in a composition with the accelerant. Where the crosslinker is an aldehyde, the accelerant may be a Bronstead acid, or a Lewis acid. Examples include, but are not limited to, HCl, p-toluenesulfonic acid, methanesulfonic acid, p-toluenesulfonic acid:pyridine complex, N-bromosuccinimide, iron trichloride, ammonium triflate, 1,3-Bis [3,5-bis(trifluoromethyl)phenyl]thiourea, 1,3-bis [3,5-bis(trifluoromethyl)phenyl] thiourea with mandelic acid, sulfuric acid, trifluoroacetic acid, titanium tetraisopropoxide, zinc chloride, acetic acid, chloroacetic acid, phosphoric acid, maleic acid, oxalic acid, p-toluenesulfonic acid:DBU complex, ammonium nitrate. An accelerant may be present in a switching material, composition or formulation in an amount of about 0.001% to about 1%, or any amount or range therebetween, for example, 0.002, 0.005, 0.01, 0.05, 0.1, 0.2, 0.3, 0.4, 0.5, 0.6, 0.7, 0.8 or 0.9 wt %.

Sacrificial solvent: a sacrificial solvent (co-solvent) may be included in a composition to confer advantageous or preferred characteristics to the composition. Such characteristics may include reduced viscosity, slower polymerization rate, coatability or the like. The switching material or components thereof, may be soluble in the sacrificial solvent. A co-solvent is compatible with other components of the composition. A co-solvent may be selected from a group comprising toluene, tetrahydrofuran (THF), methyl ethyl ketone (MEK), ethyl acetate or the like. A composition may comprise from about 10% to about 75% (by weight) of a co-solvent, or any amount or range therebetween, for example, 10, 20, 30, 40, 50, 60 or 77%, or any amount or range therebetween.

Additionally, switching material or compositions may further comprise one or more other additives, such as dyes, UV light stabilizers, antioxidants, surfactants, adhesion promoters, charge carriers, cathodic species, flow additives or the like. Examples of UV stabilizers may include ethyl-2-cyano-3,3-diphenyl acrylate (UVINUL N-35), (2-ethylhexyl)-2-cyano-3,3-diphenyl acrylate (UVINUL N539), 2-(2'-hydroxy-4'-methylphenyl)benzotriazole (TINUVIN P), 2-hydroxy-4-methoxybenzophenone (CYASORB UV 9), 2-ethyl-2'-ethoxyalanilide (SANDUVOR VSU), or the like, as may be available from BASF, Ciba-Geigy, Aceto Corp, American Cyanamid, Sandoz and Aldrich.

Methods of Preparing Switchable Materials and Coatable Formulations

Methods of preparing switchable materials, and films from such materials are described in, for example, PCT Publication WO2010/142019. The switching material may be coatable (a coatable switching material or formulation). A coatable switching material is one that is of suitable viscosity to be applied to a substrate in a suitable thickness and substantially uniform manner. Viscosity of a switching material may be altered, for example, by increasing or decreasing the quantity of sacrificial solvent, altering the polymer (different quantity and/or molecular mass), increasing or decreasing temperature of the switching material, inclusion of a rheology modifier, altering the composition or amount of the solvent portion or the like. In some embodiments, the switching material does not include a sacrificial solvent, and viscosity is manipulated by heating the switching material and/or using a heated die for coating. Partial curing of the switching material in advance of, or during the process of coating, may also increase the viscosity of the switching material applied to a moving web, or extruded or injected into a mold or extruded or applied onto a substrate. Curing may be slowed or stopped by decreasing temperature, and/or diluting the partially cured material with a co-solvent. Increasing temperature and/or removal of the co-solvent may subsequently allow curing to proceed to completion. The switching material may be prepared as a sheet or layer by extrusion through a sheeting die under pressure; the die may be heated.

The switching material, or one or more parts thereof may be treated to remove dissolved gas (oxygen, air, or the like), and/or treated to remove water, or prepared in an environment with reduced oxygen and/or reduced humidity. In some embodiments, one or more of the steps of making a switchable formulation, coating a substrate, or curing the film may be performed in an inert atmosphere (e.g. nitrogen, with less than 100 ppm oxygen, less than 100 ppm water, or both); a reduced humidity atmosphere (e.g. about 5-15% relative humidity), or in an open atmosphere.

A switching material may be coated at a suitable thickness onto a conductive coating of a substrate using a slot die, knife coater, roll-to-roll coating method, extrusion, dipping, spraying, spin coating, hand-drawing or the like. A suitable coating thickness may be selected such that the switching material is of the desired thickness once the co-solvent is evaporated (if a co-solvent is present), or the final layer is of the desired thickness following cooling and/or crosslinking of the coated switching material. For example, to obtain a final thickness of about 50 microns, a switching material with co-solvent may be applied to the substrate in a layer of about 100 to about 120 microns. A second layer of substrate is laminated on top of the coated switching material (conductive side in contact with the switching material) to form a sandwich structure. The laminated 'sandwich' may be cured, or allowed to continue to cure (for embodiments where curing is initiated during the coating or laminating process) and if desired, cut to a suitable size. Busbars or other electrical contacts may be added if desired.

In some embodiments, when the switching material is disposed upon, or sandwiched between the substrate(s), the switching material is optically clear before, after or before and after lamination (e.g. demonstrating a haze of less than about 5%, less than about 4%, less than about 3%, less than about 2% or less than about 1%. Haze may be measured using methods known in the art, for example use of an XL-211 Hazemeter from BYK-Gardner, according to manufacturer's instructions.

A second substrate may be laminated on top of the disposed switching material (with a conductive layer of the second substrate in contact with the switching material) to provide a switchable (variable transmittance) optical filter. If desired, the switchable optical filter may be cut to a desired size or shape, and electrical contacts (e.g. busbars, wires or the like) may be added, to facilitate application of a voltage to the switching material. The step of laminating may be preceded by, or followed by, a step of crosslinking or curing of the switching material. The step of curing may comprise heating the switching material to a temperature suitable for crosslinking (e.g. about 20° C. to about 90° C., or any amount or range therebetween). The step of disposing may be preceded by a step of filtration of the switching material.

In other methods, a switching material, or one or more components of the switching material, may be formed into pellets, chips or flakes and mixed with other components of the switching material, and/or a thermoplastic material (e.g. in a screw mixer) and extruded through a die to form one or more layers or films. The mixer, die and/or extruder may be heated. Alternately, the extruded material may itself be pelletized, for subsequent blending with other materials and extruded in a second extruder to produce a switchable film, or molded to produce a switchable article.

A substrate may be rigid or flexible—an optical filter comprising one or more flexible substrate(s) may be in the form of a film that may be applied to a rigid material, such as a pane of a window, or a lens. A substrate may comprise glass or some plastics polymers. Examples of glass include, but are not limited to, float glass, tempered glass, laminated glass, tinted glass, mirrored glass, flexible glass (e.g. Willow Glass from Corning), reinforced glass, chemically-strengthened glass (e.g. alkali-aluminosilicate glass—Gorilla-Glass™ from Corning), monolithic glass, multilayered glass, safety glass, bullet-resistant glass or "one-way" bullet-resistance glass. Examples of plastics (thermoplastic or thermoset polymers) include, but are not limited to, polyesters (PE), polyethylene, polypropylene, polycarbonate, polyamides, polyurethanes, polyacrylonitriles, polyacrylic acids, (e.g. poly(methacrylic acid), including polyethylene terephthalate (PET), polyolefins (PO) or copolymers or heteropolymers of any one or more of the above, or copolymers or blends of any one or more of the above with poly(siloxane)s, poly(phosphazenes)s, or latex. Examples of polyesters include, but are not limited to, homopolymers or copolymers of aliphatic, semi-aromatic or aromatic monomeric units, for example polycondensed 4-hydroxybenzoic acid and 6-hydroxynapthalene-2-carboxylic acid (VECTRAN™), polyethylene napthalate (PEN), polytrimethylene terephthalate (PTT), polybutylene terephthalate (PBT), polyethylene terephthalate (PET), polyhydroxyalkanoate (PHA), polyethylene adipate (PEA), polycaprolactone (PCL) polylactic acid (PLA), polyglycolic acid (PGA) or the like. The substrate may have UV, IR or VIS light blocking characteristics. Other examples of substrate materials include, but are not limited to, ceramic spinel or aluminum oxynitride.

The substrate may be of uniform or varying thickness, and of any suitable dimension. For example, the substrate may have a thickness from about 0.01 mm to about 10 mm, or any amount or range therebetween, for example 0.05, 0.1, 0.5, 1, 2, 3, 4, 5, 6, 7, 8, 9 or 10 mm, or from about 0.012 mm to about 10 mm, or from about 0.5 mm to 10 mm, or from about 1 mm to 5 mm, or from about 0.024 mm to about 0.6 mm, or from about 0.051 mm (2 mil) to about 0.178 mm (7 mil). In some embodiments, the thickness and/or material of a first substrate differs from the thickness and/or material of a second substrate.

A transparent conductive layer (electrode) may comprise, for example, metals, metal alloys, metal oxides, conjugated organic polymers, conductive carbon-rich materials and fine wire meshes. Exemplary conductive materials include layers of indium tin oxide (ITO), doped tin oxide, doped zinc oxide, doped cadmium oxide, fluorine tin oxide, antimony tin oxide, cubic strontium germanium oxide, polyaniline, graphene, fullerenes, carbon nanotubes, PEDOT (poly(3,4-ethylenedioxythiophene)), PEDOT:PSS (poly (3,4-ethylenedioxythiophene) poly(styrenesulfonate), and polypyrrole, as well as thin, substantially transparent metallic layers such as gold, silver, aluminum, and nickel alloy. Methods of applying the electrically conductive material to a substrate to form suitable conductive layers and electrodes are known, for example chemical deposition, sputter coating or the like. The conductive layer may be of thickness that provides adequate conductance for operation of the electrodes, and which does not appreciably interfere with the transmission of light. The thickness of the conductive layer may be from about 1 nanometer to about 90 microns, or any amount or range therebetween. In some embodiments, a conductive material may be dissolved in a suitable solvent and cast in a layer (a transparent conductive layer), and used in a composite optical filter without being applied to a substrate. In some embodiments, a substrate with a transparent conductive layer may be FTO or ITO-coated glass, or ITO-coated PET.

Thus, there is further provided, in part, a method of making a switchable film. A first substrate with a conductive coating is provided, and a flowable switching material disposed thereon. The switching material may be provided by a dispensing unit and a distributer to dispose evenly on the surface of the conductive coating a layer of the switching material. The dispensing unit may be a syringe, flask or similar container; larger volumes, or coating methods intended for continuous or semi-continuous throughput may necessitate the use of a reservoir and pump, suitable nozzles or outlets or the like. The distributer may be a knife or dispensing bar with a machined edge to provide for an even distribution of switching material of a selected thickness. In other embodiments, the switching material may be dispensed onto the surface and later distributed evenly by passing through a roll-press. For example, following dispensing, and optionally distributing, the switching material onto the surface, a second substrate with conductive coating may be applied (with conductive coating contacting the switching material) to the layer of switching material, and the 'sandwich' of switching material and substrates with coating passed between a roller nip to press the sandwich together, to provide an optical filter. The final thickness may be determined by the gap of the roller nip. For switching materials that include a co-solvent to provide a suitable viscosity for coating, the co-solvent may be removed (e.g. evaporation) before application of the second substrate. For materials that do not include a co-solvent to provide a suitable viscosity, no step of evaporation is necessary and the second substrate may be applied following dispensing and optional distribution of the switching material. To provide a suitable viscosity for coating, the switching material (without co-solvent) may be heated prior to and/or during application, using heated coating knives or bars, heated reservoir, heated roller nips or the like.

Busbars may be applied to a portion of the conductive layer or electrodes so that a voltage differential is created across the layer(s) comprising the switchable material to effect the switch. The busbars may be of any suitable material to provide a low-profile conductive area suitable for attachment of an electrical connector thereto. Examples of suitable materials include, but are not limited to, conductive adhesive, conductive ink, conductive epoxy, conductive tape, metal mesh or film or the like, comprising at least one type of conducting material for example a metal, such as aluminum, gold, silver, copper or the like. The conductive material may be applied to the conductive surface by any of several methods known in the art, including printing, painting, screen printing ('silkscreening') or the like. Electrical connectors or leads may be of any suitable material and may be affixed to the busbar by any suitable methods, including adhesion (conductive adhesive or conductive epoxy), soldering, clips, rivets or the like. Suitable material for electrical connectors may include conductive tape, wire, copper tape (e.g. Kapton) or the like. Control circuits and systems that may be used with an apparatus comprising a switching material, or layered compositions according to various embodiments are described in, for example, PCT publication WO2010/142019.

Once the switchable film has been made (and cut to shape and contacts added if desired), it may be laminated between two layers of an adhesive resin and that between two sheets of glass. Advantageously, switching materials and films as described herein may be laminated in glass with hot-melt adhesive layers, using temperatures and pressures used in conventional glass lamination. The switchable material and films do not demonstrate increased haze following heat lamination. A glass-adhesive-switchable film—adhesive-glass sandwich may be passed through a press roll, pressed between plates at an elevated temperature (about 90° C. to about 140° C.—pressure and temperature may be increased and decreased over several steps), or may be placed in a bag (rubber), with an initial bonding at a temperature of about 70° C.-110° C., while applying a vacuum to remove air between the layers. A second bonding step is then performed at a temperature of about 120° C.-150° C., with pressure (e.g. about 0.95 to about 1.5 MPa in an autoclave).

The first and/or second substrates may block, or absorb, selected ranges or wavelengths of light. In some embodiments the first and/or second substrates may be treated with, or have applied to them, a layer or coating that blocks (reflects or absorbs) selected ranges or wavelengths of light. In some embodiments, the range or wavelength of light may be in the UV range. Examples of UV blocking films that may be applied include EnergyFilm™ (described in WO2002/018132) and EnerLogic™ (described in WO2009/087575). In some embodiments the substrate is PET with a coating that blocks light of wavelengths of about 375 nm or less.

In some embodiments, the switching material, or an optical filter comprising the switching material, may be disposed upon a pane of glass, or other transparent material suitable for use as a window, or incorporation into an insulated glazing unit (IGU), or a storm window or secondary glazing. Methods of making IGU, windows or the like, and affixing an optical filter to glass or other suitable material are described in, for example, WO2010/142019 as are methods of configuring an electrical system and/or control system for operation (electrofading) of an IGU comprising an optical filter. In some embodiments, the switching material may be incorporated into an opthalmic device (e.g. visors, masks, goggles, lenses, eyeglasses (prescription or not) or the like). In some embodiments, the switching material may be used in glazing products such as architectural installations or vehicle (e.g. truck, car, airplane, train, or the like) installations. Architectural installations may be external-facing, or internal to the building, and may include a window, wall (e.g. partition, divider, full or partial wall, permanent or temporary wall), display (e.g. illuminated information panels, touchscreens, control panels). Vehicle installations include, but are not limited to, windows, sunroofs or other glazings, including sunroofs of various types including pop-up, spoiler, inbuilt, folding sunroofs, panoramic roof systems or removable roof panels. Vehicle windows include, but are not limited to, windshields, rear windows, side windows, sidelight windows, internal dividers (movable or not) to divide the interior space of a vehicle for temporary or permanent purposes. Electrical power may be provided by a separate battery, or the device may be connected to an electrical system of the device—it may be wired into a vehicle or building's electrical system.

Embodiments are illustrated, in part, by the following non-limiting methods and examples:

Methods

All reagents were sourced from Sigma-Aldrich unless otherwise indicated.

Cyclic Voltammetry (CV): CV was conducted using a three-electrode setup with a 2 mm Pt disc working electrode, a Pt wire counter electrode and an Ag/AgCl reference electrode. The three-electrode setup was placed into the electrolyte and voltammograms were acquired with a Metrohm µAutolab Potentiostat by scanning a potential window from about −1.0 volts to +2.0 volts, with a scan rate of 100 mV/s. Peak potentials were referenced using ferrocene as an internal standard at the end of each experiment. The Pt disc electrode was cleaned between each experiment by polishing with 1 um and 0.5 um diamond paste followed by sonication in distilled water then rinsed with ethanol and air dried. All experiments were performed at ambient temperatures (25° C.), and solutions were deoxygenated prior to analysis by bubbling argon gas through the solutions for 15 minutes.

Cyclic Voltammetry on a film (Film CV): Films were darkened by exposure to the light generated from a ScienceTech SS150W solar simulator fitted with an AM1.5G filter at a distance from the light source such that the film experiences an irradiance of 1 SUN for the amount of time required to achieve the PSS. The films are electrically connected to a Metrohm µAutolab potentiostat such that the working electrode from the potentiostat is connected to the film electrode closest to the light source and the counter and reference electrodes are shorted and connected to the film electrode furthest from the light source. The potential is swept from 0 V to 2 V and back to 0 V at a scan rate of 250 mV/sec and this treatment is repeated for a total of three cycles.

Photostationary state (PSS): Films were darkened by exposure to the light generated from a ScienceTech SS150W solar simulator fitted with an AM1.5G filter at a distance from the light source such that the film experiences an irradiance of 1 SUN for the amount of time required to achieve an equilibrium state in which further exposure time results in no additional changes to the UV-vis transmission spectrum for the film (PSS). Luminous transmittance ($LT_A$) of the film is plotted against light exposure time with the minimum $LT_A$ corresponding to the PSS state and maximum $LT_A$ corresponding to faded state, the difference being the dynamic range of the film.

Reduction potential and reversibility: Reduction potential ($E_{red}$ (V)) and reversibility was measured using cyclic voltammetry in a 3-electrode configuration (Pt disk working electrode (1.6 mm diameter), Ag/AgCl reference electrode and Pt wire counterelectrode). A test solution of 2 mM compound, 0.1 M tetrabutylammonium tetrafluoroborate in dichloromethane (DCM) was subjected to a 100 mV/s sweep rate to obtain a voltammogram.

Diffusion coefficient: The peak current of the anodic or cathodic compound was measured at various scan rates (25 mV/s-500 mV/s) in a test solution of 2 mM compound, 0.1 M tetrabutylammonium tetrafluoroborate in propylene carbonate, with 0, 5 or 10 wt % PMMA (Mw~996,000 g/mol). The slope of i vs. $v^{1/2}$ was determined graphically and used to calculate the diffusion coefficient (D) using the Randles-Sevcik equation:

$$i = 0.4463 nFAC\left(\frac{nFvD}{RT}\right)^{1/2}$$

where i is the peak current (A) measured in a 3-electrode CV, n is the number of electrons transferred, F is Faraday's constant ($Cmol^{-1}$), C is the concentration of the cathodic species (M), v is the scan rate ($Vs^{-1}$), D is the diffusion coefficient ($cm^2 s^{-1}$), R is the ideal gas constant and T is the temperature (K).

Solubility: solubility of a non-photochromic, anodic compound, or a cathodic compound was assessed by adding 1 wt % of compound in 1 g of solvent (propylene carbonate or 9:1 (w/w) mixture of dimethyl methyl glutarate and butylene carbonate. The solution was heated to 80° C. for 4 hours to aid dissolution, and let stand for 48 hours at room temperature. Solubility was by visual assessment for any undissolved material in the vial.

Photostability: Photostability of a compound was measured in a solution test cell and weathered behind a 363 nm or 400 nm cutoff UV filter, in a QSUN XE-3 accelerated weatherometer operating at an irradiance of 0.7 W/m$^2$ at 340 nm. A test solution of 10 wt % chromophore #1, and 0.1 or 0.5 mol equivalent cathodic species in propylene carbonate (superscript "a" of Tables 1-3) or a 9:1 (w/w) mixture of dimethyl methyl glutarate and butylene carbonate (superscript "b" of Tables 1-3). Samples were periodically removed from the QSUN, and spectra taken after photodarkening with exposure to 365 nm light and after photofading with exposure to low pressure sodium lamp (589 nm light). Degradation was tracked according to color change, $\Delta E$ ("delta E"). Failure was defined as a $\Delta E > 6$ in the faded state, and/or $\Delta E > 12$ in the darkened state. Photostability performance is tabulated relative to a control sample that does not contain the indicated compound number.

Chemical oxidation of phenazines to provide cathodic species: The phenazine compound was dissolved in dry acetonitrile or dichloromethane and purged with argon gas. An equimolar amount of chemical oxidant (nitrosyl tetrafluoroborate or nitrosyl hexafluorophosphate) was dissolved in dry acetonitrile or dichloromethane and the oxidant solution added dropwise to the redox active component, with stirring. The reaction solution was decanted from unreacted oxidant into ether, the resulting precipitate washed with ether and dried under vacuum.

Chemical oxidation of ferrocenes to provide cathodic species: the ferrocene compound was dissolved in dry dichloromethane. An equimolar amount of nitrosyl tetrafluoroborate was added, and allowed to react for 1 hour with stirring. The reaction mixture was decanted from unreacted oxidant, concentrated to half and diethyl ether was added, and cooled. The resulting precipitate was washed with ether and dried under vacuum.

Photochemical darkening; electrochemical fading: Laminated glass or multi-layer compositions are exposed to light from a Hydrofarm FLP24 light source to darken the switching material, resulting in a decrease in the light transmittance of the material in the visible range. The light source is tuned off and an electric charge of about 1.3 Volts is then applied to the switching material for 90 seconds, causing the switching material to switch to a faded state. In the faded state, more light is permitted to pass through the switching material resulting in an increase in light transmittance in the visible range. Color coordinates (L*, a*, b*) in the dark and faded states are calculated from the corresponding transmission spectra in order to monitor colour change, $\Delta E$ (delta E) (according to CIE 1976), as a function of test time. The half-life for electrofading kinetics is calculated as the time for the glass laminate to transition from the dark state to an $LT_A$ value equal to 50% of the difference between dark state and light state $LT_A$ values.

Electrical Durability Test: Laminated glass or multi-layer compositions are continuously exposed to light from a Hydrofarm FLP24 light source to darken the switching material at a temperature of 27° C. Simultaneously, an electric charge of 1.3 Volts was applied to the glass laminate in 1 hour intervals (1 hour on/1 hour off). Samples are periodically removed from testing to measure the electrofading half life and colour coordinates.

EXAMPLE 1

Formula II Compounds

Some compounds according to Formula II (compounds [1]-[5]) were tested for reduction potential, reversibility of redox cycle, solubility and photostability, relative to a control. Results are reported in Table 1.

TABLE 1

| | Formula II compounds | | | | |
|---|---|---|---|---|---|
| | | Reversible | Solubility | | Photostability |
| Compound | $E_{red}$ (V) | (y/n) | 9:1 RI:BC | PC | relative to control |
| [1] | −0.2 | Y | N | Y | >0.72 |
| [2] | −0.3 | Y | Y | Y | 1.2[b] |
| [3] | −0.3 | Y | Y | Y | 0.8[b] |
| [4] | −0.4 | Y | Y | Y | >0.4 |
| [5] | −0.4 | Y | Y | Y | >0.72 |

[b]—in 9:1 (w/w) mixture of dimethyl methyl glutarate and butylene carbonate

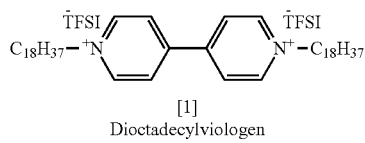

[1]
Dioctadecylviologen

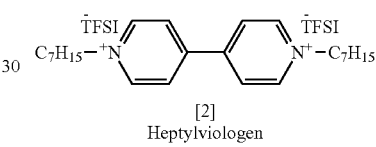

[2]
Heptylviologen

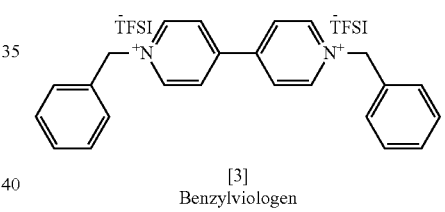

[3]
Benzylviologen

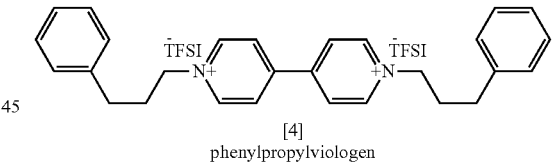

[4]
phenylpropylviologen

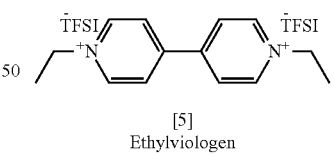

[5]
Ethylviologen

The dihalide salt of [4] was prepared according to Albrech et al., 2010 (J. Materials Chemistry 20:3025-3034). Compounds [1]-[5] were prepared from the dihalide salt by salt metathesis with LiTFSI.

EXAMPLE 2

Formula III Compounds

Some compounds according to Formula III (compounds [6]-[10]) were tested for reduction potential, reversibility of redox cycle, solubility and photostability, relative to a control. Results are reported in Table 2.

TABLE 2

Formula III compounds

| Compound | $E_{red}$ (V) | Reversible (y/n) | Solubility 9:1 RI:BC | PC | Photostability relative to control |
|---|---|---|---|---|---|
| [6] | +0.7 | Y | | | |
| [7] | +0.6 | Y | | | 0.46[a] |
| [8] | +0.4 | Y | | | |
| [9] | −0.2 | Y | | | 1.1[a] |
| [10] | −0.04 | Y | Y | Y | 1.2[a] |

[a]—in propylene carbonate
Compounds [6], [7] and [8] spontaneously oxidized chromophore #1.

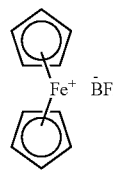

[6]
ferrocenium

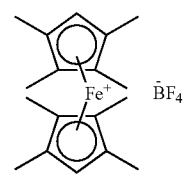

[9]
octamethylferrocenium

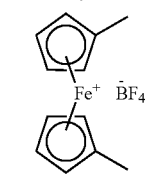

[8]
dimethylferrocenium

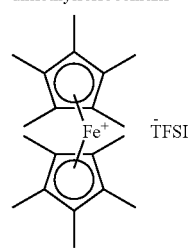

[10]
decamethylferrocenium

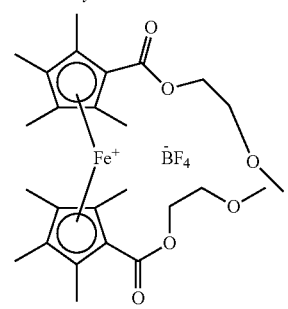

[7]
Octamethyldimethoxyethylcarbonate ferrocenium

[6] is available commercially; [7]-[10] were prepared by chemical oxidation of corresponding, commercially available ferrocene as described.

EXAMPLE 3

Formula V Compounds

Some compounds according to Formula V (compounds [11]-[14]) were tested for reduction potential, reversibility of redox cycle, solubility and photostability, relative to a control. Results are reported in Table 2.

TABLE 3

Formula V compounds

| Compound | $E_{red}$ (V) | Reversible (y/n) | Solubility 9:1 RI:BC | PC |
|---|---|---|---|---|
| [11] | +0.9 | Y | | |
| [12] | +0.3 | Y | N | Y |
| [13] | +0.3 | Y | N | Y |
| [14] | −0.1 | Y | N | Y |

[11]
10-methyl-4H-phenothiazin-10-ium

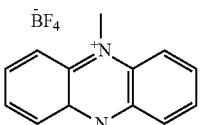

[12]
5,10-dimethyl-9,10-dihydrophenzain-5-ium

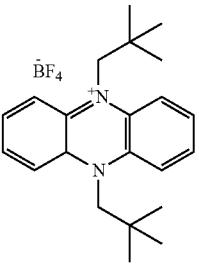

[13]
5,10-diisopopyl-9,10-dihydrophenazin-5-ium

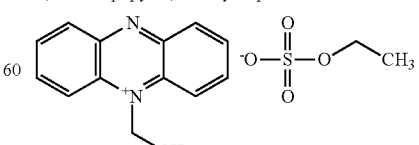

[14]
Phenazine ethosulfate

Compound [11] oxidizes chromophore #1. Compound [14] demonstrates improved solubility with -TFSI anion. Compound [11]-[13] were prepared by chemical oxidation of the corresponding, commercially available phenazine. Compound [14] was prepared by salt metathesis from phenazine ethosulfate.

EXAMPLE 4

Diffusion Coefficients

Diffusion coefficients for some cathodic compounds were determined as described. Results are reported in Table 4. A higher diffusion coefficient may be indicative of greater availability of the cathodic compound at the cathode, and may allow for lower concentrations to be tolerated in the switching material.

TABLE 4

Diffusion coefficients of selected compounds

| Compound | Diffusion Coefficient ($\times 10^{-6}$ cm$^2$s$^{-1}$) | | | | |
|---|---|---|---|---|---|
| | 9:1 RI:BC | 9:1 RI:BC + 5 wt % B300HH | PC | PC + 5 wt % PMMA | PC + 10 wt % PMMA |
| [40] | 2.1 | 0.3 | 1.6 | 0.6 | 0.1 |
| [10] w/BF$_4$ anion | 1.4 | 0.7 | | | |
| [10] w/TFSI anion | | | 3.4 | 2.1 | 1.3 |
| [5] | | | 3.2 | 1.6 | 0.5 |
| [18] | | | 2.9 | | |

EXAMPLE 5

Diarylethene Compounds

The reduction potential of some diarylethenes compounds (chromophores #1-#9) were determined. Results are reported in Table 5.

TABLE 5

Selected chromophores. All chromophores were tested at a concentration of 0.001 M, with 0.1 M TBABF$_4$ in dichloromethane. PCT Publication WO2013/044371 describes synthetic methods for each of chromophores #1 to #9, all of which are incorporated herein by reference.

| Chromophore | Closed Form Oxidation (vs Ag/AgCl) | Open Form Oxidation (vs Ag/AgCl) |
|---|---|---|
| #1 | 0.94 V | 1.36 V |

TABLE 5-continued
Selected chromophores. All chromophores were tested at a
concentration of 0.001 M, with 0.1 M TBABF$_4$ in dichloromethane. PCT Publication
WO2013/044371 describes synthetic methods for each of chromophores #1 to #9, all of
which are incorporated herein by reference.
| Chromophore | Closed Form Oxidation (vs Ag/AgCl) | Open Form Oxidation (vs Ag/AgCl) |
|---|---|---|
| #2 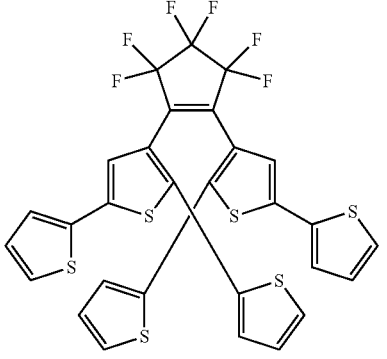 [SMILES: FC1(F)C(c2cc(-c3cccs3)sc2-c2cccs2)=C(c2cc(-c3cccs3)sc2-c2cccs2)C(F)(F)C1(F)F] | 1.08 V | 1.63 V |
| #3 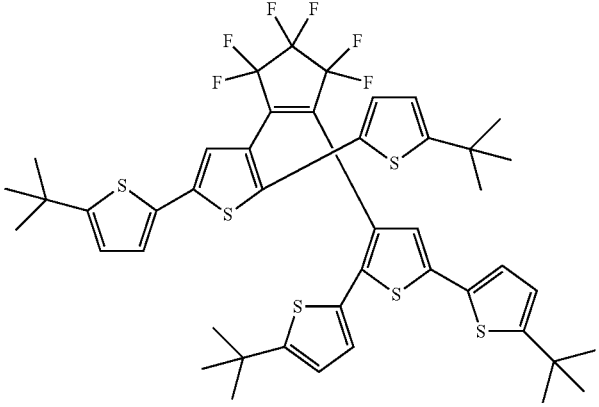 [SMILES: CC(C)(C)c1ccc(-c2cc(C3=C(c4cc(-c5ccc(C(C)(C)C)s5)sc4-c4ccc(C(C)(C)C)s4)C(F)(F)C(F)(F)C3(F)F)c(-c3ccc(C(C)(C)C)s3)s2)s1] | 0.93 V | 1.37 V |
| #4 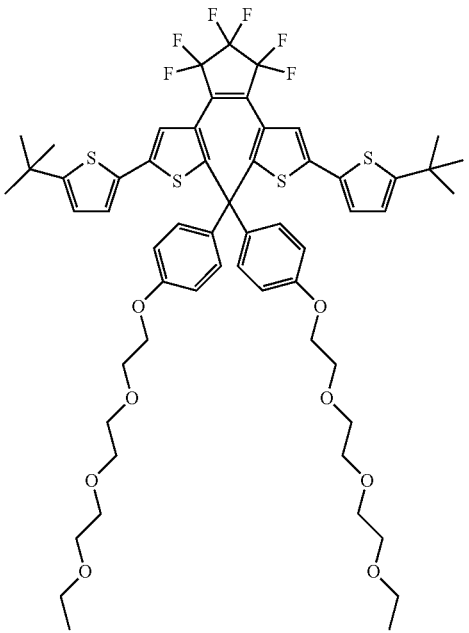 [SMILES: CCOCCOCCOCCOc1ccc(C2(c3ccc(OCCOCCOCCOCC)cc3)c3sc(-c4ccc(C(C)(C)C)s4)cc3C3=C(c4cc(-c5ccc(C(C)(C)C)s5)sc42)C(F)(F)C(F)(F)C3(F)F)cc1] | 0.97 V | 1.51 V |

TABLE 5-continued

Selected chromophores. All chromophores were tested at a
concentration of 0.001 M, with 0.1 M TBABF$_4$ in dichloromethane. PCT Publication
WO2013/044371 describes synthetic methods for each of chromophores #1 to #9, all of
which are incorporated herein by reference.

| Chromophore | Closed Form Oxidation (vs Ag/AgCl) | Open Form Oxidation (vs Ag/AgCl) |
|---|---|---|
| #5 | 1.11 V | 1.40 V |
| #6 | 1.11 V | 1.34 V |
| #7 | 1.16 V | 1.44 V |

TABLE 5-continued

Selected chromophores. All chromophores were tested at a
concentration of 0.001 M, with 0.1 M TBABF$_4$ in dichloromethane. PCT Publication
WO2013/044371 describes synthetic methods for each of chromophores #1 to #9, all of
which are incorporated herein by reference.

| Chromophore | Closed Form Oxidation (vs Ag/AgCl) | Open Form Oxidation (vs Ag/AgCl) |
|---|---|---|
| #8 (structure) | 0.98 V | 1.36 V |
| #9 (structure) | 0.93 V | 1.34 V |

EXAMPLE 6

Photochemical Darkening and Electrochemical Fading

Preparation of test devices: Switching materials (Table 6) for testing were prepared by dissolving all of the formulation components (except for Desmodur N3600 and EVTFSI2) in 1.75 weight equivalents THF, capped and stirred on a hotplate set to 90° C. for 18 hours and then cooled to room temperature. EVTFSI$_2$ is added as a stock solution in THF and the composition is stirred at 22° C. for 1 hour. Desmodur N3600 is then added as a stock solution in THF and the formulation is stirred for 5 minutes. After mixing the formulation is dispensed onto a sheet of gold-coated PET (10 ohm/sq sheet resistance) and coated to a target thickness using a motorized drawdown coater. THF is allowed to evaporate prior to lamination of a second sheet of gold-coated PET. The coated composition was allowed to cure at room temperature for 18 hours followed by 1 hour at 80° C. The cured film is cut to shape, fitted with electrical leads, sealed inside a PET envelope with polyisobutylene and epoxy and laminated between two panes of glass using polyvinylbutyral using a standard vacuum bag lamination process at 135° C. and a vacuum pressure of 2 torr to provide a 75 mm by 75 mm laminated glass test device.

TABLE 6

Switching materials. PVB-6 is a polyvinylbutyral resin (Kuraray) (MW 250-300K, 12-16% PVOH content; 1-4% PVA content).

| | A | B | C | D |
|---|---|---|---|---|
| Chromophore #1 | 9 wt % (78 mM) | 9 wt % (78 mM) | 4.72 wt % (41 mM) | 9 wt % (78 mM) |
| Chromophore #9 | 5 wt % (70 mM) | 5 (70 mM) | 3.63 wt % (50 mM) | 5 wt % (70 mM) |
| Rhodiasolv IRIS | 64.2 wt % | 48.265 wt % | 65.608 wt % | 67.116 wt % |
| 1,2-butylene carbonate | 4.5 wt % | 16.088 wt % | 7.29 wt % | 0 wt % |
| EMIM FAP | 1 wt % | 5 wt % | 2.5 wt % | 3.2 wt % |
| EVTFSI$_2$ | 0.67 wt % (9.56 mM) | 1.03 wt % (14.7 mM) | 0.642 wt % (9.12 mM) | 0.10 wt % (1.48 mM) |

TABLE 6-continued

Switching materials. PVB-6 is a polyvinylbutyral resin (Kuraray) (MW 250-300K, 12-16% PVOH content; 1-4% PVA content).

|  | A | B | C | D |
|---|---|---|---|---|
| PVB-6 | 15 wt % | 15 wt % | 15 wt % | 15 wt % |
| Desmodur N3600 | 0.18 wt % | 0.21 wt % | 0.21 wt % | 0.18 wt % |
| K-KAT 6212 | 0.4 wt % | 0.4 wt % | 0.4 wt % | 0.4 wt % |
| [EVTFSI$_2$]/ ([Chromophore # 1] + [Chromophore # 9]) | 0.065 | 0.100 | 0.100 | 0.010 |
| Thickness of switchable layer | 42 micron | 40 micron | 24 micron | 40 micron |

EVTFSI$_2$ = ethylviologen with TFSI counterion.

Figure 2:
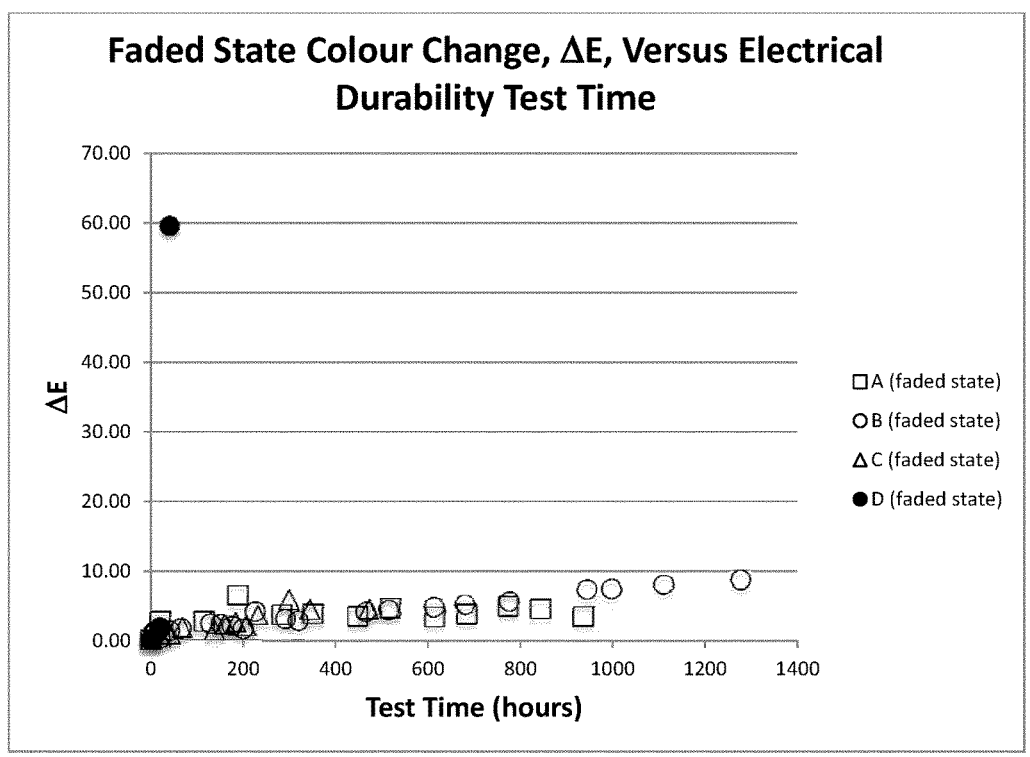
FIG. 2 shows a plot of the faded state color change ΔE vs. electrical durability test time for switching materials, according to another embodiment. Switching material A—open square; switching material B—open circle; switching material C—open triangle; switching material D—solid circle.

The relative color change in the dark and faded state ($\Delta E_{dark}$, $\Delta E_{faded}$), and electrofading half life, ($t_{1/2}$) (electrical durability) values were determined for the four switching materials of Table 6. A $\Delta E$ of less than 10 in the dark state was observed for all switching materials A-D. In the faded state, devices with switching material A, B and C maintained a relatively constant delta E of less than 10 for the entire testing time. Switching material D failed at 40 hours—they failed to electrofade, and demonstrated a delta E of about 60 (FIG. 2).

Figure 3:
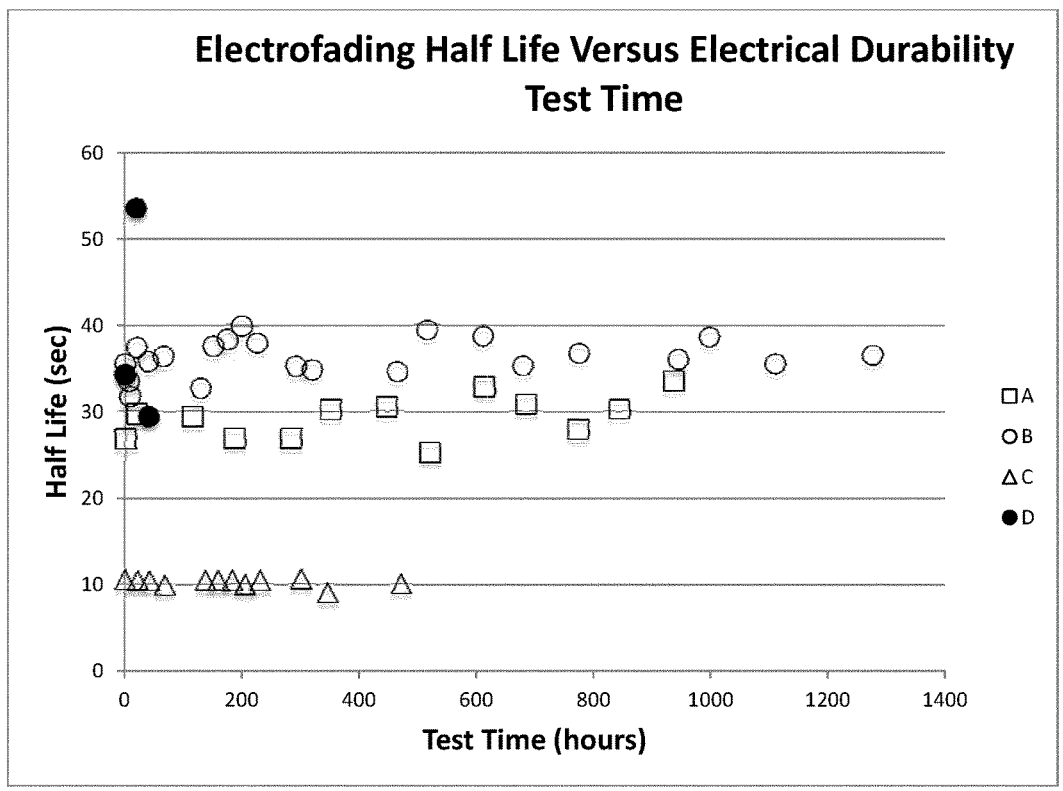
FIG. 3 shows a plot of the electrofading half-life ($t_{1/2}$) vs. electrical durability test time for switching materials, according to another embodiment. Switching material A—open square; switching material B—open circle; switching material c—open triangle; switching material D—solid circle

FIG. 3 shows the electrofading half-life of switching materials of Table 6. Electrofading half-life for devices with switching materials A, B and C maintained relatively constant for the duration of the testing. Devices with switching material D demonstrated substantially greater variability in half-life, and were deemed failed at about 40 hours testing.

The relative performance of the formulation compositions indicate the chromophore, supporting electrolyte (EMIM-FAP), PVB and isocyanate (Desmodur N3600) concentrations as well as thickness of switchable layer do not impact performance significantly. To achieve more consistent electrofading half-life times and reduced colour change ($\Delta E$) in the light state a molar ratio of charge compensator (EVTFSI$_2$) to total chromophore above 0.01 is desirable, however a stoichiometric mole ratio is not required for device operation. Inclusion of a high dielectric constant cosolvent, 1,2-butylene carbonate also results in improved performance.

Other Embodiments

It is contemplated that any embodiment discussed in this specification can be implemented or combined with respect to any other embodiment, method, composition or aspect, and vice versa. Figures are not drawn to scale unless otherwise indicated.

The present invention has been described with regard to one or more embodiments. However, it will be apparent to persons skilled in the art that a number of variations and modifications can be made without departing from the scope of the invention as defined in the claims. Therefore, although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to," and the word "comprises" has a corresponding meaning. As used herein, the singular forms "a", "an" and "the" include plural referents unless the context clearly dictates otherwise. Citation of references herein shall not be construed as an admission that such references are prior art to the present invention, nor as any admission as to the contents or date of the references. The invention includes all embodiments and variations substantially as hereinbefore described and with reference to the examples and drawings.

Unless defined otherwise, all technical and scientific terms used herein have the same meaning as is commonly understood by one of ordinary skill in the art to which this invention belongs. If a definition set forth in this section is contrary to or otherwise inconsistent with a definition set forth in the documents that are herein incorporated by reference, the definition set forth herein prevails.

What is claimed is:

1. A composition comprising:
   (a) a first photochromic anodic species, wherein the first photochromic anodic species is a diarylethene, reversibly convertible between ring-closed and ring-open isomers;
   (b) a cathodic species, wherein the cathodic species comprises a viologen, a substituted viologen, a phenazinium, a substituted phenazinium, a ferrocenium or a substituted ferrocenium salt, and wherein the cathodic species has a reduction potential at least 600 mV less anodic than a ring-closed oxidation potential of the first photochromic anodic species; and
   (c) an electrolyte, wherein the electrolyte comprises:
   (i) a supporting electrolyte; and
   (ii) a solvent portion comprising one or more solvents.

2. The composition of claim 1, wherein the first photochromic anodic species and the cathodic species are present in a ratio of from about 100:1 to about 2:1.

3. The composition of claim 1, wherein the cathodic species has a reduction potential between −1.0 and +0.6 V referenced to Ag/AgCl.

4. The composition of claim 1, wherein reduction of the cathodic species is reversible.

5. The composition of claim 1, wherein the composition is transitionable from a light state to a dark state on exposure to light of less than 475 nm, 450 nm, or 400 nm, and from a dark state to a light state with application of a voltage.

6. The composition of claim 1, wherein the first photochromic anodic species has an oxidation potential of from about 0.6V to about 1.3V.

7. The composition of claim 1, comprising a second photochromic anodic species.

8. The composition of claim 7, wherein ring-closed oxidation potentials of the photochromic anodic species are within 200 mV of one another, within 100 mV of one another, within 50 mV of one another or within 25 mV of one another.

9. The composition of claim 1, further comprising a polymer, wherein the polymer comprises one or more monomeric units according to Formula VI:

(VI)

wherein:
each of $R_{70}$, $R_{71}$, $R_{72}$ are independently H or a hydrocarbon group $C_nH_{2n+1}$;
$R_{73}$ is H, $C_nH_{2n+1}$, $C_nH_{2n}OH$, $C_nH_{2n}NCO$, or

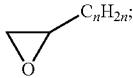

and
n is 1, 2, 3, 4, 5, 6, 7, 8, 9 or 10.

10. The composition of claim 9, wherein the polymer comprises a pendant hydroxyl group, a pendant primary alcohol group, a pendant secondary alcohol group, a pendant epoxide group or a pendant isocyanate group.

11. The composition of claim 10, wherein the polymer is cross-linked through the pendant hydroxyl group, the hydroxyl moiety of the pendant primary alcohol group, the hydroxyl moiety of the pendant secondary alcohol group, the pendant epoxide group or the pendant isocyanate group.

12. The composition of claim 9, wherein the polymer is cross-linked via a urethane linkage.

13. The composition of claim 1, wherein the photochromic anodic species are soluble in the electrolyte at a concentration of at least about 50 mM, 75 mM, 100 mM, or 200 mM, or wherein the cathodic species are soluble in the electrolyte at a concentration of at least about 5 mM, 10 mM, 25 mM, 50 mM, 75 mM, 100 mM or 200 mM.

14. An electrochromic device comprising the composition of claim 1.

15. An optical filter comprising:
(a) a first substantially transparent substrate and a second substantially transparent substrate;
(b) a first electrode and a second electrode disposed on a surface of at least one of said substrates;
(c) a layer comprising the composition according to claim 1 disposed between the first substantially transparent substrate and the second substantially transparent substrate, and in contact with the first electrode and the second electrode.

16. The optical filter according to claim 15, further comprising a UV light blocker capable of blocking UV light at wavelengths of less than about 365 nm, less than about 375 nm, less than about 385 nm, less than about 400 nm, or less than about 410 nm.

17. A method of preparing an optical filter, the method comprising:
(a) disposing a layer of the composition according to claim 1 between a first substantially transparent substrate and a second substantially transparent substrate wherein a first electrode and a second electrode are disposed on a surface of at least one of the substrates such that the layer is in contact with each electrode; and
(b) providing an electrical connector for connecting the first electrode and the second electrode to a source of electric voltage.

18. An optical filter comprising:
(a) a first substantially transparent substrate and a second substantially transparent substrate;
(b) a first electrode disposed on a surface of the first substantially transparent substrate;
(c) a second electrode disposed on a surface of the second substantially transparent substrate;
(d) a cathodic material disposed on a surface of the first electrode, wherein the cathodic material comprises a viologen, a substituted viologen, a phenazinium, a substituted phenazinium, a ferrocenium or a substituted ferrocenium salt, and wherein the cathodic material has a reduction potential at least 600 mV less anodic than a ring-closed oxidation potential of a first photochromic anodic species; and
(e) a layer of switching material disposed between the first substantially transparent substrate and the second substantially transparent substrate and in contact with the first electrode and the second electrode, the layer of switching material comprising:
(i) at least one photochromic anodic species, wherein the first photochromic anodic species of the at least one photochromic anodic species is a diarylethene, reversibly convertible between ring-closed and ring-open isomers; and
(ii) an electrolyte comprising a supporting electrolyte and a solvent portion comprising one or more solvents; and
wherein the cathodic material is insoluble in the layer of switching material.

* * * * *